United States Patent
Saori

(10) Patent No.: US 7,813,051 B2
(45) Date of Patent: Oct. 12, 2010

(54) HIGH ZOOM-RATIO ZOOM LENS SYSTEM

(75) Inventor: Masakazu Saori, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/535,100

(22) Filed: Aug. 4, 2009

(65) Prior Publication Data

US 2010/0033838 A1   Feb. 11, 2010

(30) Foreign Application Priority Data

Aug. 8, 2008   (JP)   ............... 2008-205473

(51) Int. Cl.
 *G02B 15/14*   (2006.01)
(52) U.S. Cl. ...................... 359/683; 359/676
(58) Field of Classification Search ................ 359/676, 359/683, 684
See application file for complete search history.

(56) References Cited

U.S. PATENT DOCUMENTS

| | | | |
|---|---|---|---|
| 5,189,557 A | | 2/1993 | Endo |
| 5,666,229 A | * | 9/1997 | Ohtake ....................... 359/683 |
| 5,892,626 A | * | 4/1999 | Kohno ........................ 359/676 |
| 6,010,537 A | * | 1/2000 | Konno et al. ................. 359/389 |
| 6,061,186 A | * | 5/2000 | Nishio ........................ 359/684 |
| 7,417,801 B2 | * | 8/2008 | Nakatani et al. ............ 359/687 |
| 2003/0156333 A1 | | 8/2003 | Yamada |
| 2004/0051959 A1 | | 3/2004 | Eguchi |
| 2007/0297067 A1 | | 12/2007 | Muramatsu et al. |

FOREIGN PATENT DOCUMENTS

| | | |
|---|---|---|
| JP | 4-186212 | 7/1992 |
| JP | 10-333037 | 12/1998 |
| JP | 2003-241097 | 8/2003 |
| JP | 2006-259016 | 9/2006 |
| JP | 2006-337648 | 12/2006 |
| JP | 2008-003195 | 1/2008 |

OTHER PUBLICATIONS

English language Abstract of JP 4-186212, Jul. 3, 1992.
English language Abstract of JP 10-333037, Dec. 18, 1998.
English language Abstract of JP 2003-241097, Aug. 27, 2003.
English language Abstract of JP 2006-259016, Sep. 28, 2006.
English language Abstract of JP 2006-337648, Dec. 14, 2006.
English language Abstract of JP 2008-003195, Jan. 10, 2008.

* cited by examiner

*Primary Examiner*—Scott J Sugarman
(74) *Attorney, Agent, or Firm*—Greenblum & Bernstein P.L.C.

(57) ABSTRACT

A high zoom-ratio zoom lens system of five lens groups includes a positive first lens group, a negative second lens group, a positive third lens group, a positive fourth lens group, and a negative fifth lens group, in this order from the object.

Upon zooming from the short focal length extremity to the long focal length extremity, a distance between the first lens group and the second lens group increases, and a distance between the second lens group and the third lens group decreases.

The high zoom-ratio zoom lens system satisfies the following conditions:

$$5.5 < f1/|f2| < 10.0 \ (f2<0) \quad (1)$$

$$1.7 < f3/f4 < 4.0 \quad (2)$$

wherein
 f1 designates the focal length of the first lens group;
 f2 designates the focal length of the second lens group;
 f3 designates the focal length of the third lens group; and
 f4 designates the focal length of the fourth lens group.

20 Claims, 13 Drawing Sheets

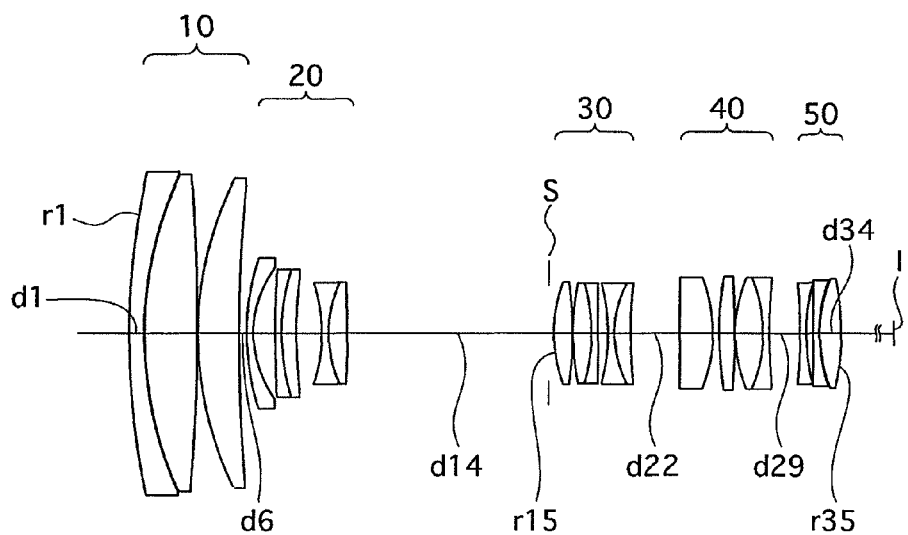
Fig.1
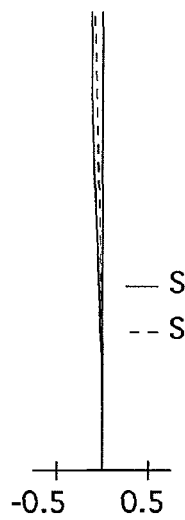
Fig.2A
FNo.=1:3.6
— SA
-- SC
-0.5  0.5
SPHERICAL
ABERRATION
THE SINE
CONDITION
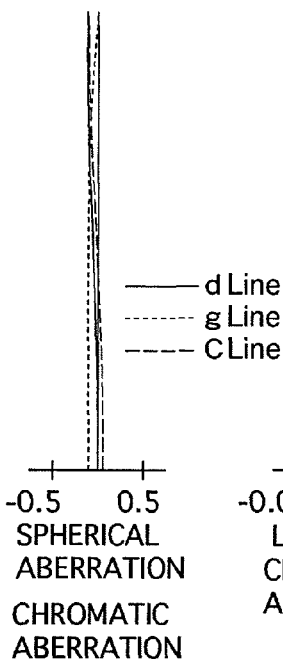
Fig.2B
FNo.=1:3.6
——— d Line
······· g Line
----- C Line
-0.5  0.5
SPHERICAL
ABERRATION
CHROMATIC
ABERRATION
Fig.2C
W=29.7
-0.05  0.05
LATERAL
CHROMATIC
ABERRATION
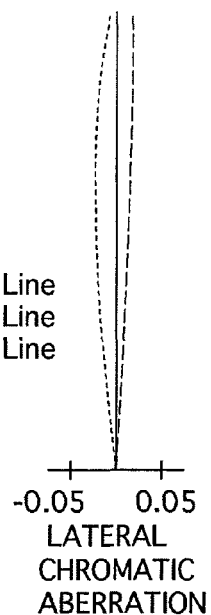
Fig.2D
W=29.7
— S
-- M
-0.5  0.5
ASTIGMATISM
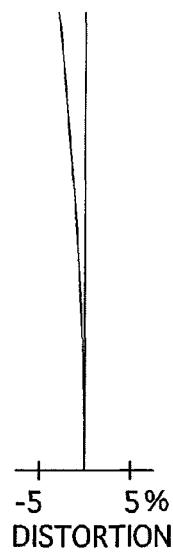
Fig.2E
W=29.7
-5  5%
DISTORTION

Fig.3
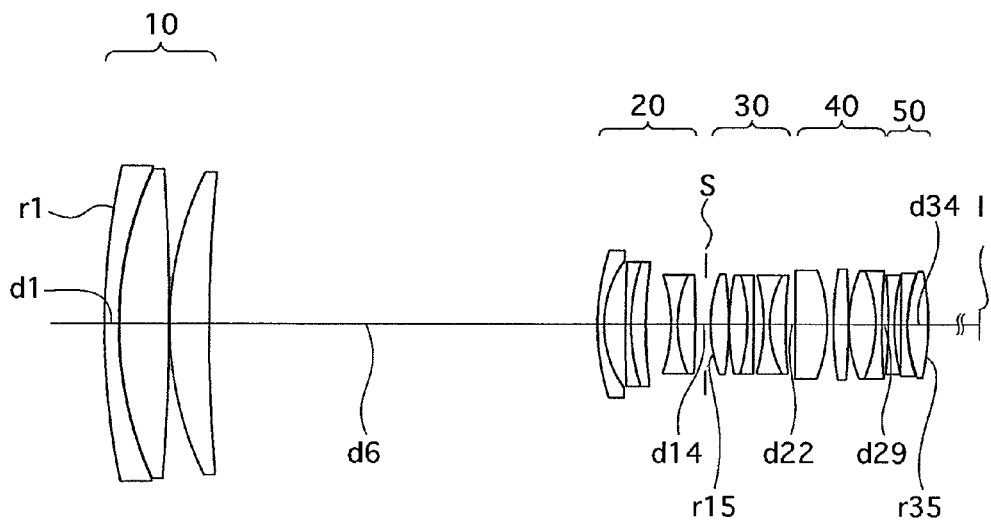
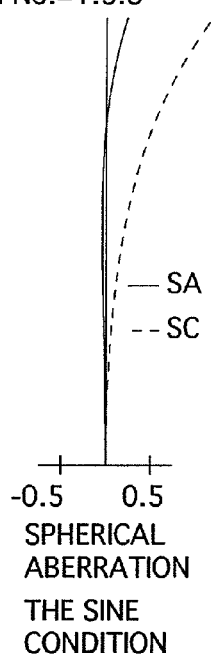
Fig.4A
FNo.=1:5.8
— SA
--- SC
-0.5  0.5
SPHERICAL
ABERRATION
THE SINE
CONDITION
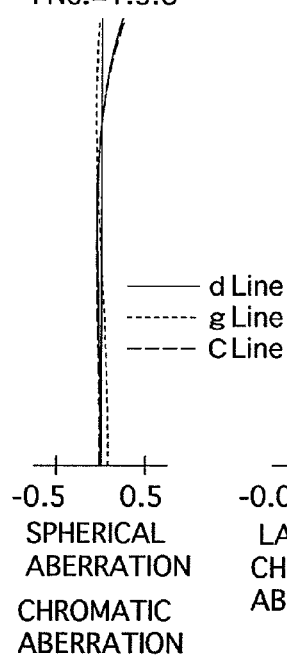
Fig.4B
FNo.=1:5.8
— d Line
··· g Line
--- C Line
-0.5  0.5
SPHERICAL
ABERRATION
CHROMATIC
ABERRATION
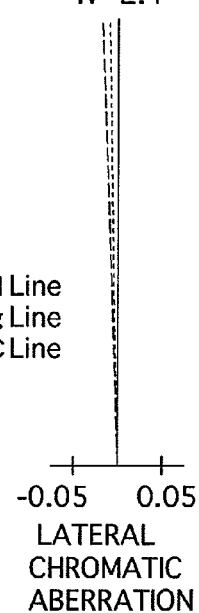
Fig.4C
W=2.4
-0.05  0.05
LATERAL
CHROMATIC
ABERRATION
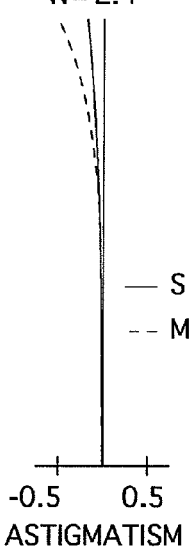
Fig.4D
W=2.4
— S
-- M
-0.5  0.5
ASTIGMATISM
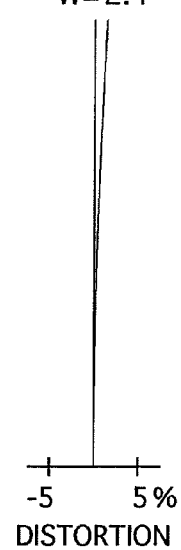
Fig.4E
W=2.4
-5  5%
DISTORTION Fig.5
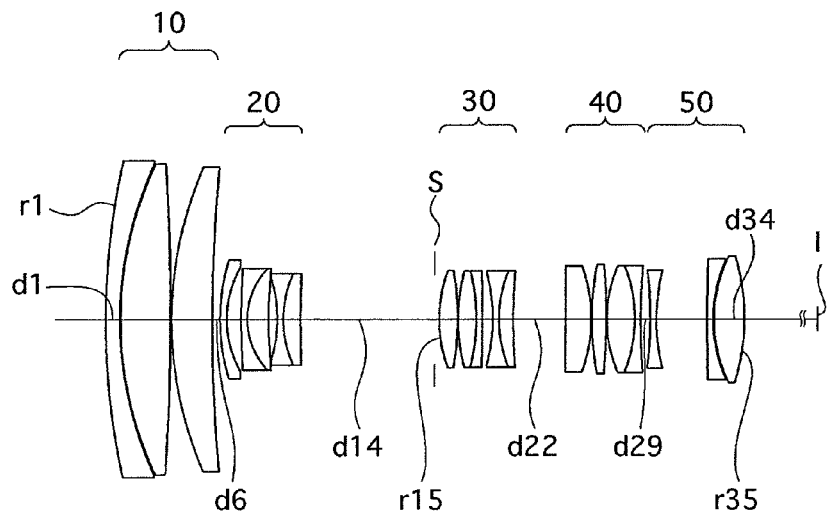
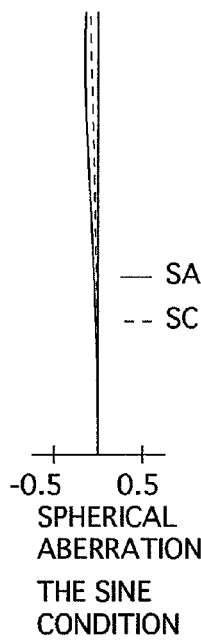
Fig.6A
FNo.=1:3.6
—— SA
-- SC
-0.5  0.5
SPHERICAL
ABERRATION
THE SINE
CONDITION
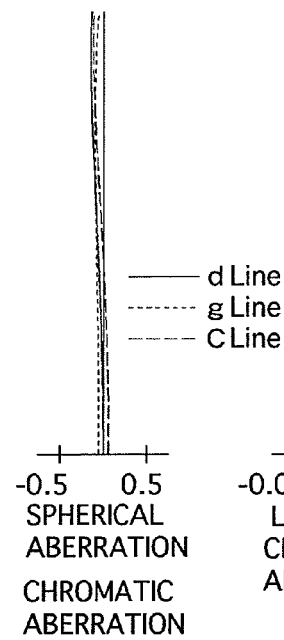
Fig.6B
FNo.=1:3.6
—— d Line
······· g Line
---- C Line
-0.5  0.5
SPHERICAL
ABERRATION
CHROMATIC
ABERRATION
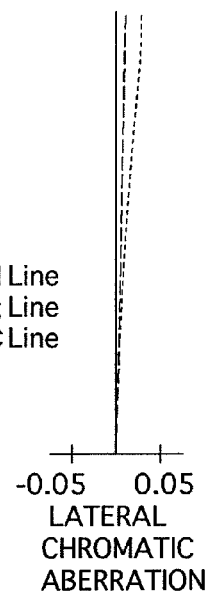
Fig.6C
W=30.5
-0.05  0.05
LATERAL
CHROMATIC
ABERRATION
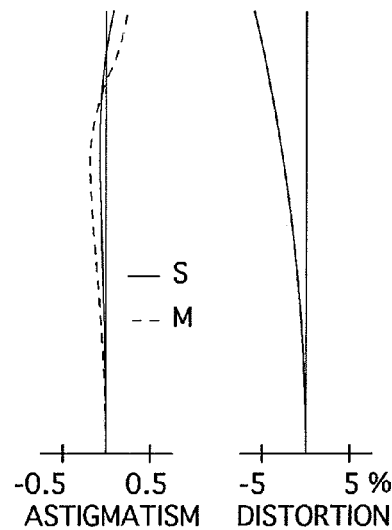
Fig.6D
W=30.5
—— S
-- M
-0.5  0.5
ASTIGMATISM
Fig.6E
W=30.5
-5  5 %
DISTORTION FNo.=1:5.8

— SA
-- SC

-0.5  0.5
SPHERICAL
ABERRATION

THE SINE
CONDITION

FNo.=1:5.8

— d Line
····· g Line
---- C Line

-0.5  0.5
SPHERICAL
ABERRATION

CHROMATIC
ABERRATION

W=2.4

-0.05  0.05
LATERAL
CHROMATIC
ABERRATION

W=2.4

— S
-- M

-0.5  0.5
ASTIGMATISM

W=2.4

-5  5 %
DISTORTION

Fig. 9
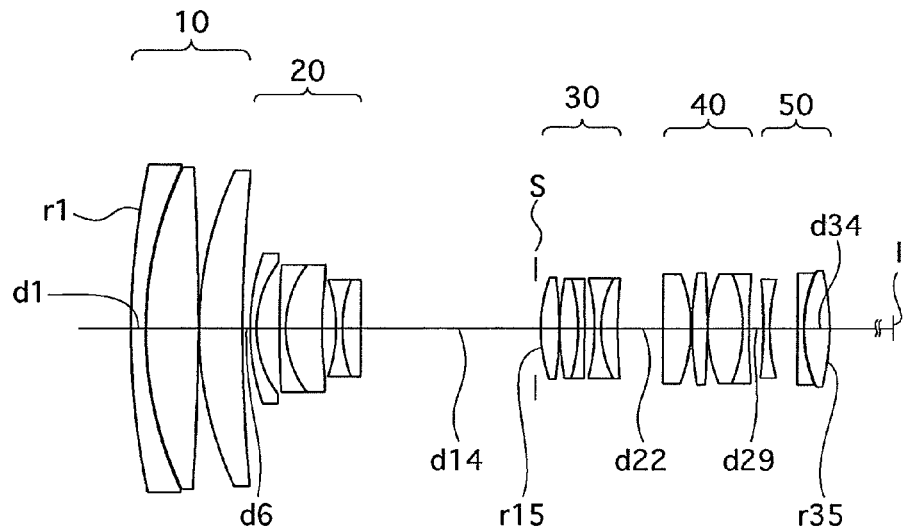
Fig.10A  Fig.10B  Fig.10C  Fig.10D  Fig.10E
FNo.=1:3.6  FNo.=1:3.6  W=30.0  W=30.0  W=30.0
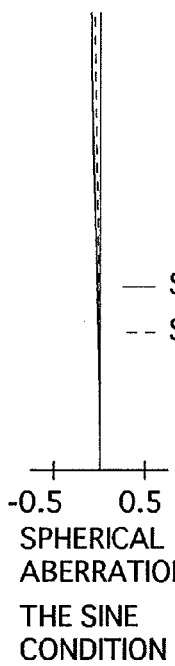
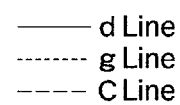
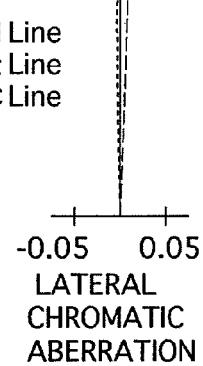
|  -0.5   0.5  |  -0.5   0.5  |  -0.05   0.05  |  -0.5   0.5  |  -5   5% |
| SPHERICAL ABERRATION THE SINE CONDITION | SPHERICAL ABERRATION CHROMATIC ABERRATION | LATERAL CHROMATIC ABERRATION | ASTIGMATISM | DISTORTION |

Fig.11
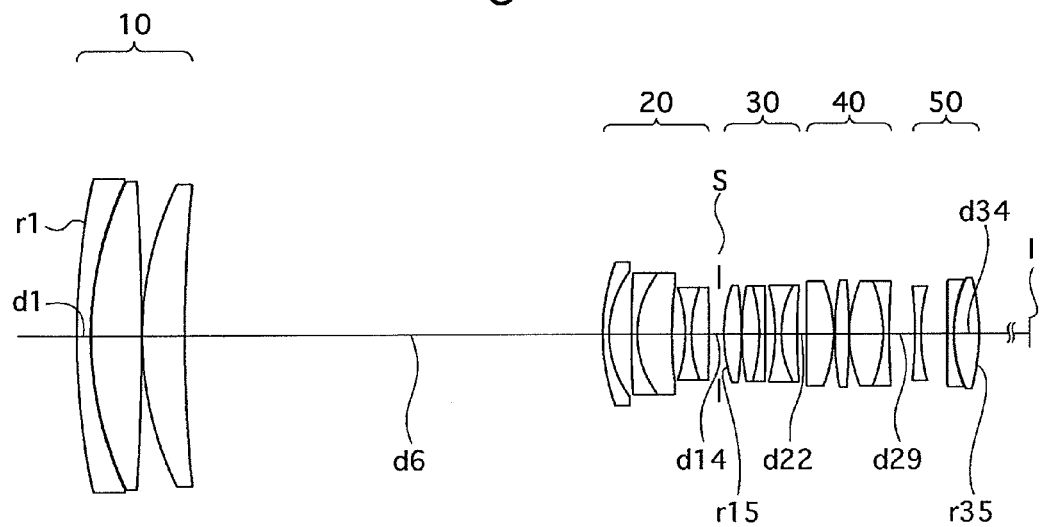
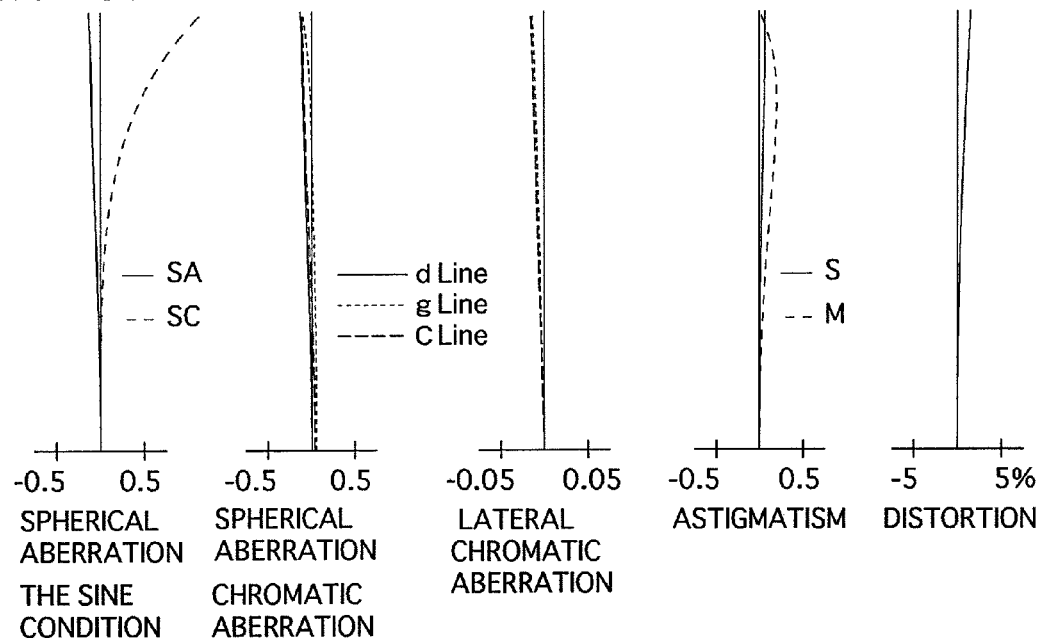
Fig.12A FNo.=1:5.6 SPHERICAL ABERRATION THE SINE CONDITION
— SA
-- SC
Fig.12B FNo.=1:5.6 SPHERICAL ABERRATION CHROMATIC ABERRATION
— d Line
······ g Line
---- C Line
Fig.12C W=2.4 LATERAL CHROMATIC ABERRATION
Fig.12D W=2.4 ASTIGMATISM
— S
-- M
Fig.12E W=2.4 DISTORTION

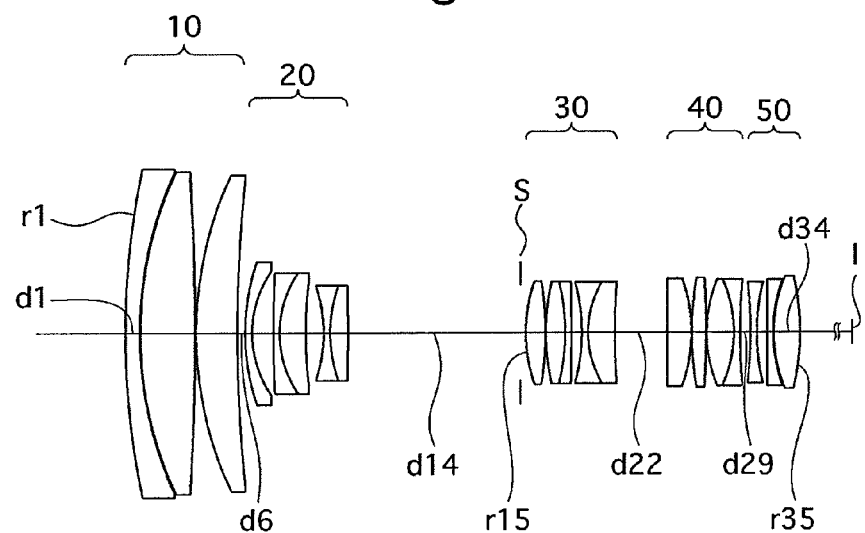
Fig.13
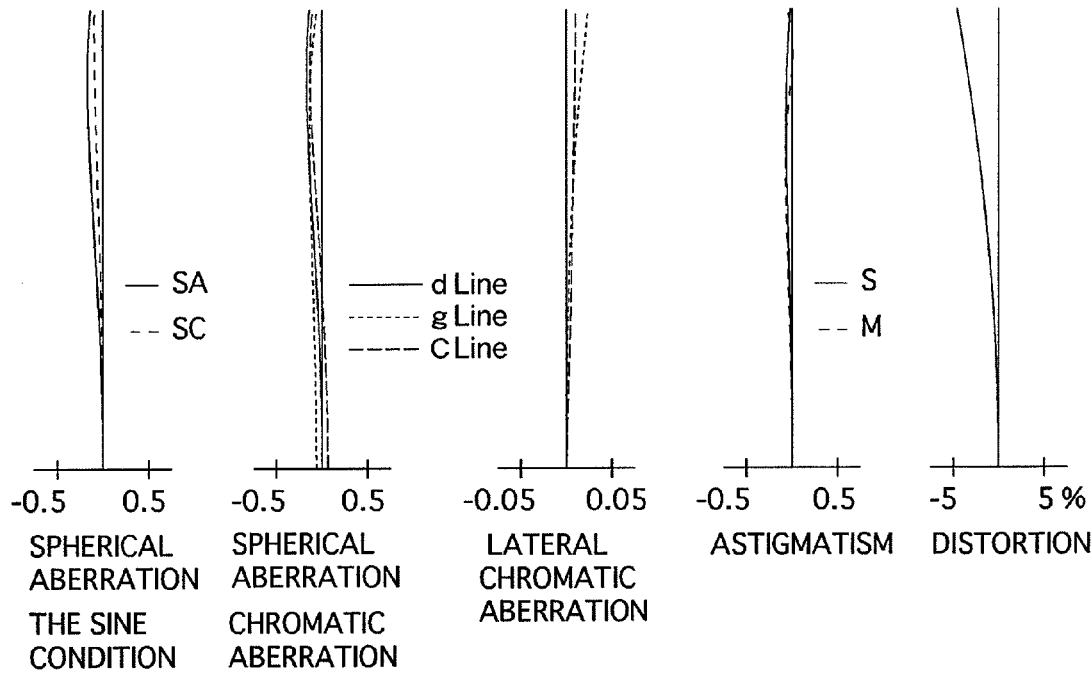

Fig.15
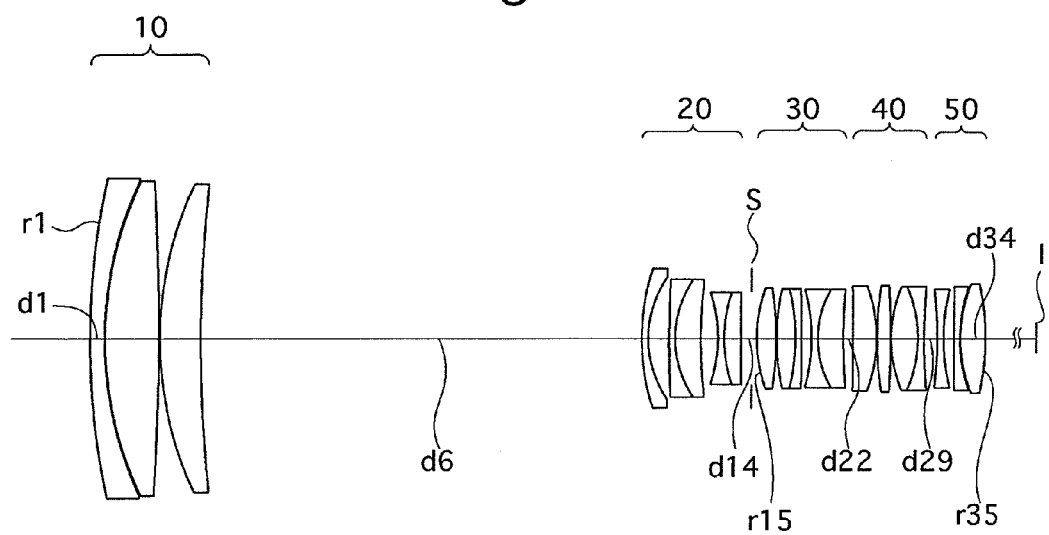
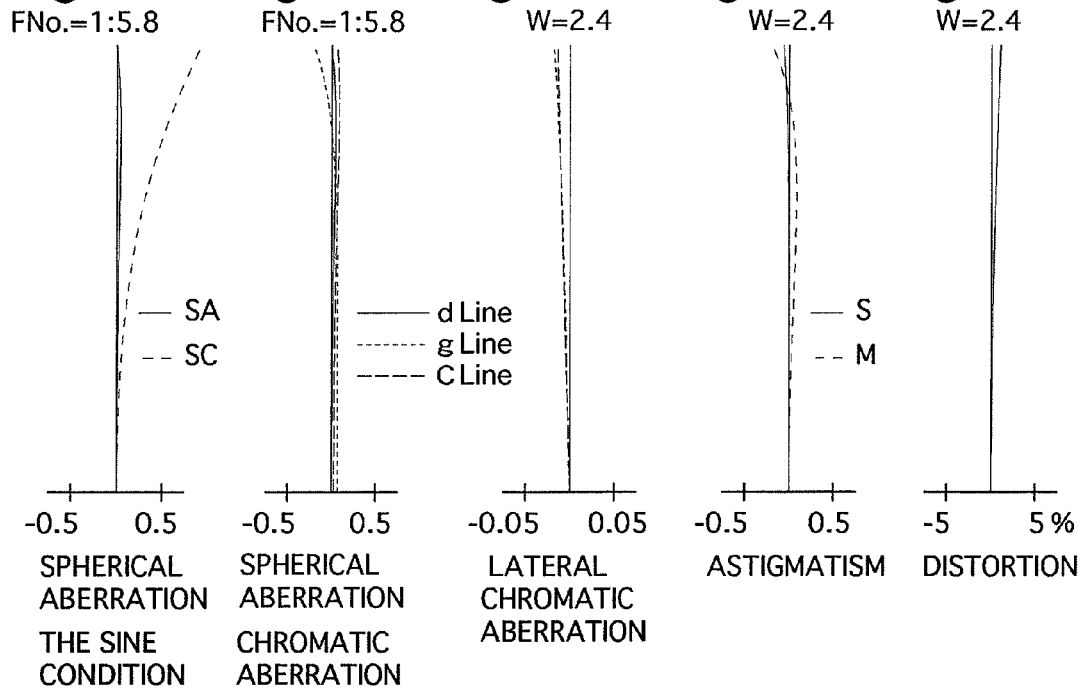
Fig.16A FNo.=1:5.8
Fig.16B FNo.=1:5.8
Fig.16C W=2.4
Fig.16D W=2.4
Fig.16E W=2.4

Fig.19
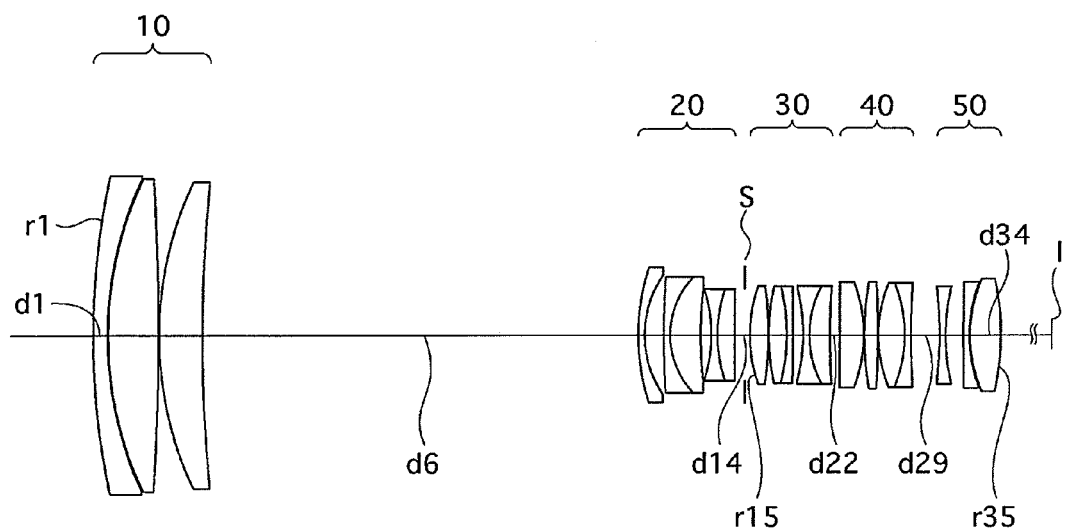
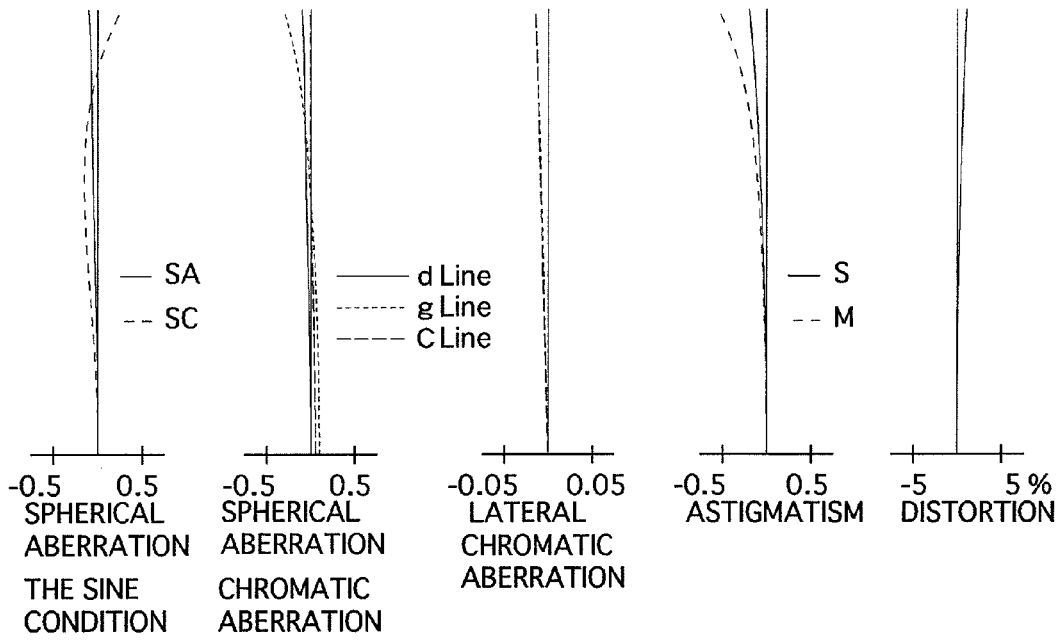

Fig.21
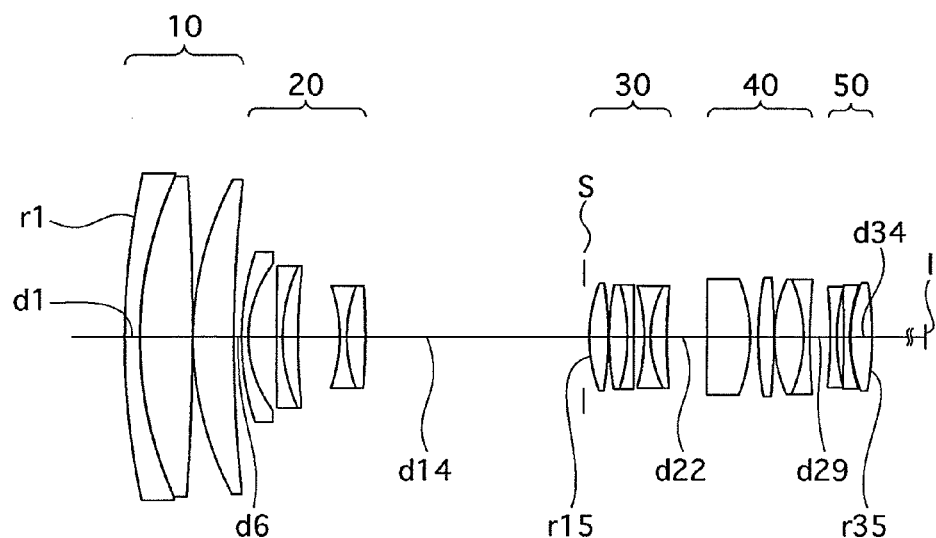
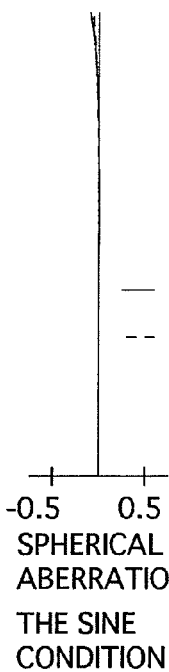
Fig.22A
FNo.=1:3.6
— SA
-- SC
-0.5   0.5
SPHERICAL
ABERRATION
THE SINE
CONDITION
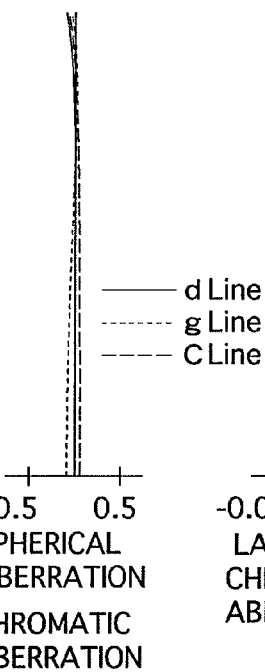
Fig.22B
FNo.=1:3.6
——— d Line
········ g Line
------ C Line
-0.5   0.5
SPHERICAL
ABERRATION
CHROMATIC
ABERRATION
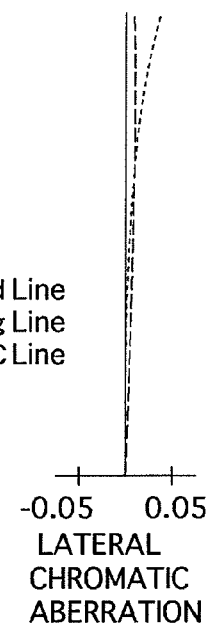
Fig.22C
W=29.9
-0.05   0.05
LATERAL
CHROMATIC
ABERRATION
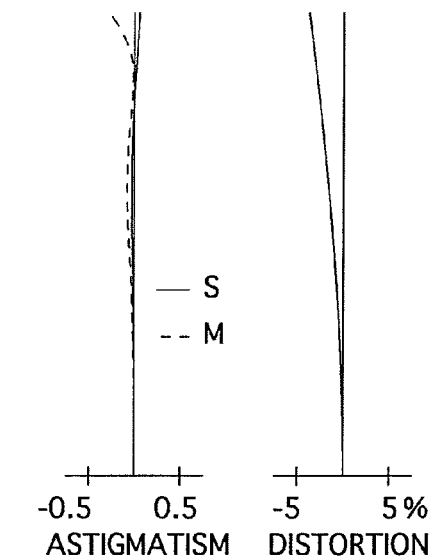
Fig.22D
W=29.9
— S
-- M
-0.5   0.5
ASTIGMATISM
Fig.22E
W=29.9
-5    5%
DISTORTION Fig.23
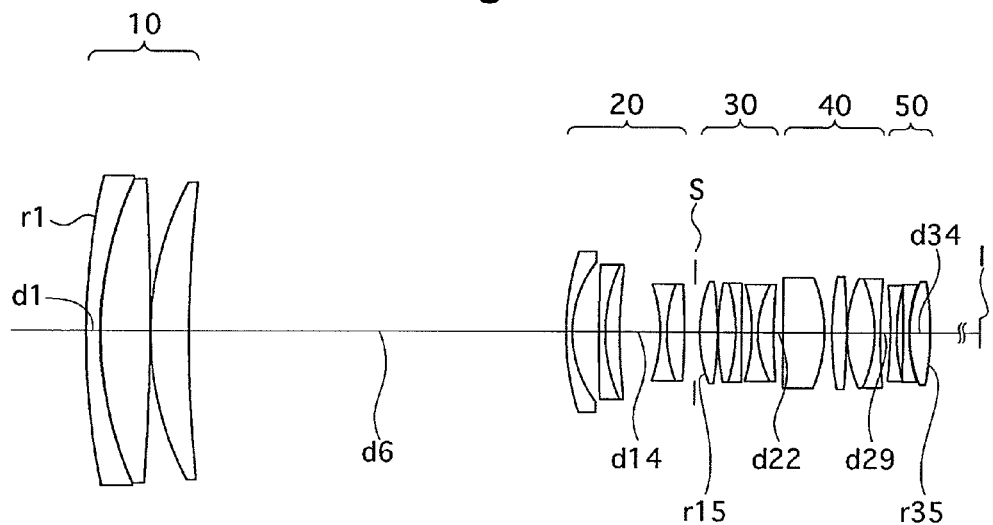
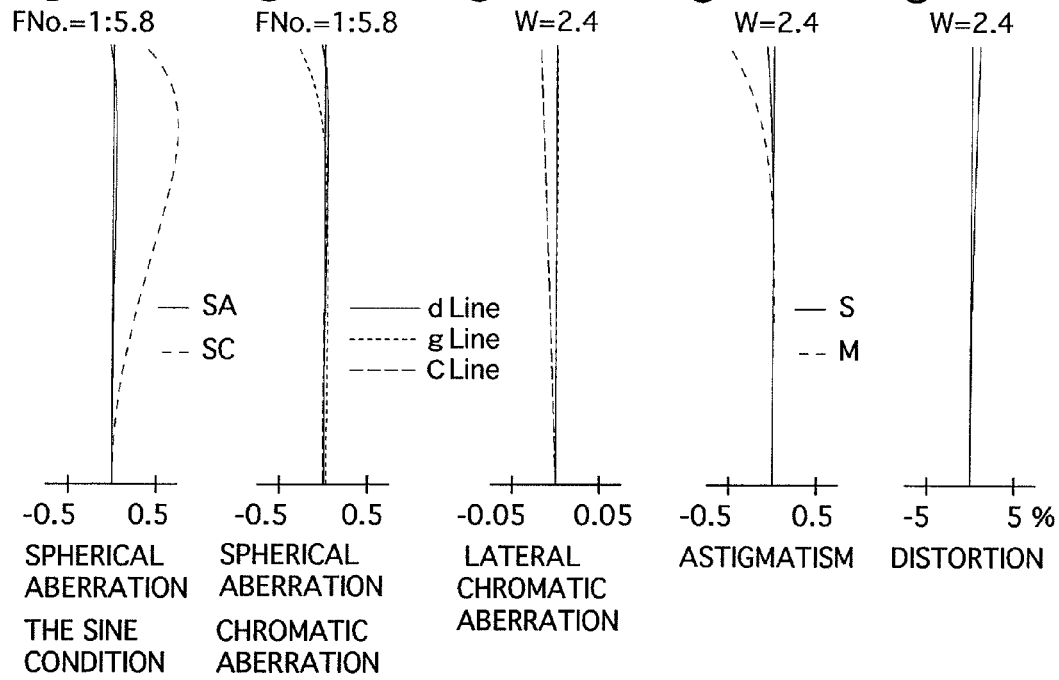
Fig.24A FNo.=1:5.8
Fig.24B FNo.=1:5.8
Fig.24C W=2.4
Fig.24D W=2.4
Fig.24E W=2.4
— SA
-- SC
— d Line
······ g Line
---- C Line
— S
-- M
SPHERICAL ABERRATION THE SINE CONDITION
SPHERICAL ABERRATION CHROMATIC ABERRATION
LATERAL CHROMATIC ABERRATION
ASTIGMATISM
DISTORTION

HIGH ZOOM-RATIO ZOOM LENS SYSTEM

BACKGROUND OF THE INVENTION

1. Field of the Invention

The present invention relates to a high zoom-ratio zoom lens system having a zoom ratio exceeding 13, which is suitable for an SLR camera, especially for a digital SLR camera.

2. Description of Related Art

In a high zoom-ratio zoom lens system having a zoom ratio of approximately 10, a zoom lens system of four lens groups, e.g., a lens group having a positive refractive power (a positive lens group), a lens group having a negative refractive power (a negative lens group), and other two positive lens groups in this order from the object, is commonly used (e.g., Japanese Unexamined Patent Publication Nos. 2008-003195, 2006-259016 and 2003-241097).

Furthermore, a zoom lens system of five lens groups (e.g., Japanese Unexamined Patent Publication Nos. H10-333037 and 2006-337648), and a zoom lens system of six lens groups (Japanese Unexamined Patent Publication No. H04-186212) are also known in the art.

In the high zoom-ratio zoom lens system having the four lens groups such as in JUPP Nos. 2008-003195, 2006-259016 and 2003-241097, the focal length at the long focal length extremity is not sufficiently secured, i.e., around 250 mm to 300 mm; and, since the second lens group mainly carrying out zooming is also arranged to function as a focusing lens group, the second lens group is required to have four to six lens elements. Therefore such a zoom lens system is not suitable for autofocusing since the focusing lens group (i.e., the second lens group) becomes heavier. Furthermore, the F-number is approximately 6.3, which means that the illumination in an image is dark.

In JUPP No. H10-333037, a fifth lens group having a weak negative refractive power is added to a zoom lens system of the four lens groups, so that the fundamental characteristics thereof are same as those of JUPP Nos. 2008-003195, 2006-259016 and 2003-241097.

The zoom lens system disclosed in JUPP No. 2006-337648 is the so-called 'telephoto' zoom lens system in which the angle-of-view at the short focal length extremity is less than 35°.

The zoom lens system disclosed in JUPP No. H04-186212, in which optical performance at the telephoto side is particularly improved, achieves a focal length of 350 mm at the long focal length extremity and an F-number of 5.6; however, the focal length at the short focal length extremity is 35 mm. If such a zoom lens system is used in an APS-C sized digital SLR camera, the angle-of-view at the short focal length extremity is only around 45°.

SUMMARY OF THE INVENTION

The present invention provides a high zoom-ratio zoom lens system of five lens groups (i.e., a positive lens group, a negative lens group, a positive lens group, a positive lens group, and a negative lens group, in this order from the object) with superior optical quality:

(i) a zoom ratio exceeding 13;
(ii) a focal length of 350 mm at the long focal length extremity;
(iii) an F-number of 5.6; and
(iv) an angle-of-view of approximately 60° at the short focal length extremity.

The above-explained high zoom-ratio zoom lens system of the present invention can be formed as a rear-focus type zoom lens system, by which rapid focusing is possible.

According to a first aspect of the present invention, there is provided a high zoom-ratio zoom lens system of five lens groups including a positive first lens group, a negative second lens group, a positive third lens group, a positive fourth lens group, and a negative fifth lens group, in this order from the object.

Upon zooming from the short focal length extremity to the long focal length extremity, a distance between the positive first lens group and the negative second lens group increases, and a distance between the negative second lens group and the positive third lens group decreases.

The high zoom-ratio zoom lens system satisfies the following conditions:

$$5.5 < f1/|f2| < 10.0 \, (f2<0) \tag{1}$$

$$1.7 < f3/f4 < 4.0 \tag{2}$$

wherein f1 designates the focal length of the positive first lens group;

f2 designates the focal length of the negative second lens group;

f3 designates the focal length of the positive third lens group; and f4 designates the focal length of the positive fourth lens group.

The high zoom-ratio zoom lens system preferably satisfies the following conditions:

$$4.5 < f1/fw < 10.0 \tag{3}$$

$$1.4 < fBw/fw < 2.0 \tag{4}$$

wherein f1 designates the focal length of the positive first lens group;

fw designates the focal length of the entire zoom lens system at the short focal length extremity; and fBw designates the back focal distance at the short focal length extremity.

According to a second aspect of the present invention, there is provided a high zoom-ratio zoom lens system of five lens groups including a positive first lens group, a negative second lens group, a positive third lens group, a positive fourth lens group, and a negative fifth lens group, in this order from the object.

Upon zooming from the short focal length extremity to the long focal length extremity, a distance between the positive first lens group and the negative second lens group increases, and a distance between the negative second lens group and the positive third lens group decreases.

The high zoom-ratio zoom lens system satisfies the following conditions:

$$4.5 < f1/fw < 10.0 \tag{3}$$

$$1.4 < fBw/fw < 2.0 \tag{4}$$

wherein f1 designates the focal length of the positive first lens group;

fw designates the focal length of the entire zoom lens system at the short focal length extremity; and fBw designates the back focal distance at the short focal length extremity.

According to a third aspect of the present invention, there is provided a high zoom-ratio zoom lens system of four lens groups including a positive first lens group, a negative second lens group, a positive third lens group, and a positive fourth lens group, in this order from the object.

Upon zooming from the short focal length extremity to the long focal length extremity, a distance between the positive first lens group and the negative second lens group increases, and a distance between the negative second lens group and the positive third lens group decreases.

The high zoom-ratio zoom lens system satisfies the following conditions:

$$5.5<f1/|f2|<10.0(f2<0) \quad (1)$$

$$1.7<f3/f4<4.0 \quad (2)$$

$$4.5<f1/fw<10.0 \quad (3)$$

$$1.4<fBw/fw<2.0 \quad (4)$$

wherein f1 designates the focal length of the positive first lens group;

f2 designates the focal length of the negative second lens group;

f3 designates the focal length of the positive third lens group;

f4 designates the focal length of the positive fourth lens group;

fw designates the focal length of the entire zoom lens system at the short focal length extremity; and fBw designates the back focal distance at the short focal length extremity.

In the first to third aspects, the high zoom-ratio zoom lens system preferably satisfies the following condition:

$$0.4<Z2/Z<0.6 \quad (5)$$

wherein

Z designates the zoom ratio of the entire zoom lens system (=ft/fw);

Z2 designates the zoom ratio of the negative second lens group (=m2t/m2w);

ft designates the focal length of the entire zoom lens system at the long focal length extremity;

fw designates the focal length of the entire zoom lens system at the short focal length extremity;

m2w designates the lateral magnification of the negative second lens group at the short focal length extremity; and m2t designates the lateral magnification of the negative second lens group at the long focal length extremity.

In the first to third aspects, the negative second lens group preferably includes a negative lens element, cemented lens elements having a negative lens element and a positive lens element, and cemented lens elements having a negative lens element and a positive lens element, in this order from the object.

According to the first and second aspects of the present invention in which the high zoom-ratio zoom lens system of five lens groups including a positive first lens group, a negative second lens group, a positive third lens group, a positive fourth lens group, and a negative fifth lens group, in this order from the object, the negative fifth lens group is arranged to function as a focusing lens group, and the high zoom-ratio zoom lens system preferably satisfies the following conditions:

$$2.2<m5t<3.5 \quad (6)$$

$$2.0<f5/f2<5.0 \quad (7)$$

wherein m5t designates the lateral magnification of the negative fifth lens group at the long focal length extremity;

f5 designates the focal length of the negative fifth lens group; and f2 designates the focal length of the negative second lens group.

Furthermore, the high zoom-ratio zoom lens system preferably satisfies the following condition:

$$1.5<|f5|/fw<4.5(f5<0) \quad (8)$$

wherein f5 designates the focal length of the negative fifth lens group; and fw designates the focal length of the entire zoom lens system at the short focal length extremity.

The negative fifth lens group, i.e., the focusing lens group, includes a negative lens element, a negative lens element and a positive lens element, in this order from the object.

According to a fourth aspect of the present invention, there is provided a high zoom-ratio zoom lens system of five lens groups including a positive first lens group, a negative second lens group, a positive third lens group, a positive fourth lens group, and a negative fifth lens group, in this order from the object.

Focusing is performed by moving the negative fifth lens group in the optical axis direction.

The high zoom-ratio zoom lens system satisfies the following conditions:

$$2.2<m5t<3.5 \quad (6)$$

$$2.0<f5/f2<5.0 \quad (7)$$

wherein m5t designates the lateral magnification of the negative fifth lens group at the long focal length extremity;

f5 designates the focal length of the negative fifth lens group; and f2 designates the focal length of the negative second lens group.

In the fourth aspect, the high zoom-ratio zoom lens system preferably satisfies the following condition:

$$1.5<|f5|/fw<4.5(f5<0) \quad (8)$$

wherein f5 designates the focal length of the negative fifth lens group; and fw designates the focal length of the entire zoom lens system at the short focal length extremity.

Also, in the fourth aspect, the negative fifth lens group includes a negative lens element, a negative lens element and a positive lens element, in this order from the object.

The present disclosure relates to subject matter contained in Japanese Patent Application No. 2008-205473 (filed on Aug. 8, 2008) which is expressly incorporated herein in its entirety.

BRIEF DESCRIPTION OF THE DRAWINGS

The present invention will be discussed below in detail with reference to the accompanying drawings, in which:

FIG. 1 shows a lens arrangement of a first embodiment of the high zoom-ratio zoom lens system according to the present invention at the short focal length extremity;

FIGS. 2A, 2B, 2C, 2D and 2E show aberrations occurred in the lens arrangement shown in FIG. 1;

FIG. 3 shows the lens arrangement of the first embodiment of the high zoom-ratio zoom lens system at the long focal length extremity;

FIGS. 4A, 4B, 4C, 4D and 4E show aberrations occurred in the lens arrangement shown in FIG. 3;

FIG. 5 shows a lens arrangement of a second embodiment of the high zoom-ratio zoom lens system according to the present invention at the short focal length extremity;

FIGS. 6A, 6B, 6C, 6D and 6E show aberrations occurred in the lens arrangement shown in FIG. 5;

FIG. 9 shows a lens arrangement of a third embodiment of the high zoom-ratio zoom lens system according to the present invention at the short focal length extremity;

FIGS. 10A, 10B, 10C, 10D and 10E show aberrations occurred in the lens arrangement shown in FIG. 9;

FIG. 11 shows the lens arrangement of the third embodiment of the high zoom-ratio zoom lens system at the long focal length extremity;

FIGS. 12A, 12B, 12C, 12D and 12E show aberrations occurred in the lens arrangement shown in FIG. 11;

FIG. 13 shows a lens arrangement of a fourth embodiment of the high zoom-ratio zoom lens system according to the present invention at the short focal length extremity;

FIGS. 14A, 14B, 14C, 14D and 14E show aberrations occurred in the lens arrangement shown in FIG. 13;

FIG. 15 shows the lens arrangement of the fourth embodiment of the high zoom-ratio zoom lens system at the long focal length extremity;

FIGS. 16A, 16B, 16C, 16D and 16E show aberrations occurred in the lens arrangement shown in FIG. 15;

FIG. 19 shows the lens arrangement of the fifth embodiment of the high zoom-ratio zoom lens system at the long focal length extremity;

FIGS. 20A, 20B, 20C, 20D and 20E show aberrations occurred in the lens arrangement shown in FIG. 19;

FIG. 21 shows a lens arrangement of a sixth embodiment of the high zoom-ratio zoom lens system according to the present invention at the short focal length extremity;

FIGS. 22A, 22B, 22C, 22D and 22E show aberrations occurred in the lens arrangement shown in FIG. 21;

FIG. 23 shows the lens arrangement of the sixth embodiment of the high zoom-ratio zoom lens system at the long focal length extremity;

FIGS. 24A, 24B, 24C, 24D and 24E show aberrations occurred in the lens arrangement shown in FIG. 23;

DESCRIPTION OF THE PREFERRED EMBODIMENTS

Figure 25:
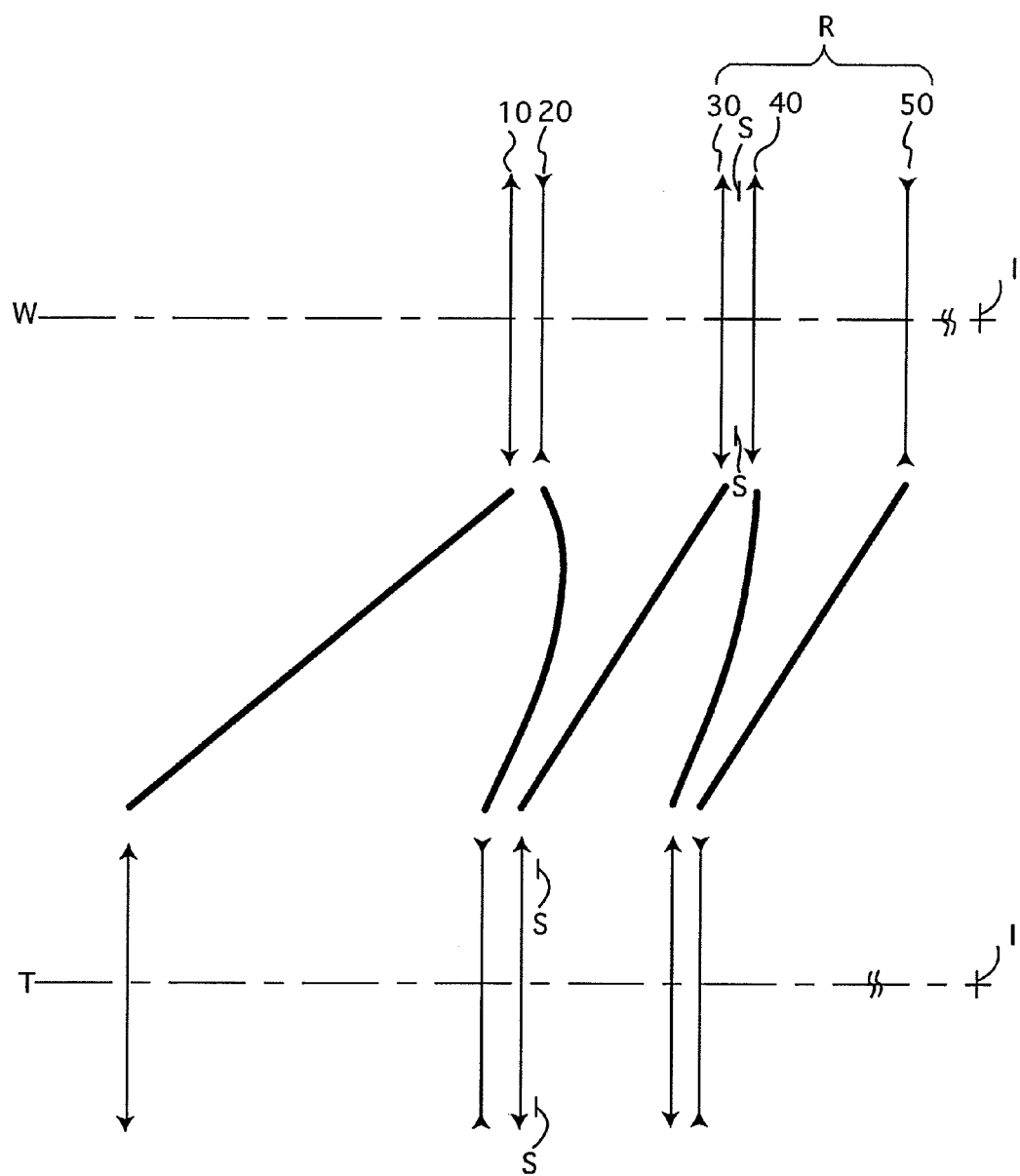
FIG. 25 is the schematic view of the lens-group moving paths for the high zoom-ratio zoom lens system according to the present invention.

The high zoom-ratio zoom lens system of the present invention, as shown the lens-group moving paths of FIG. 25, includes a positive first lens group 10, a negative second lens group 20, a positive third lens group 30, a positive fourth lens group 40, and a negative fifth lens group 50, in this order from the object.

Upon zooming from the short focal length extremity (W) to the long focal length extremity (T), the positive first lens group 10, the positive third lens group 30, and the negative fifth lens group 50, each move monotonically toward the object; the negative second lens group 20 first moves toward the image and thereafter moves toward the object.

During this zooming operation, the distance between the positive first lens group 10 and the negative second lens group 20 increases, and the distance between the negative second lens group 20 and the positive third lens group 30 decreases.

A diaphragm S is provided in front of the positive third lens group 30, and moves integrally with the positive third lens group 30.

The negative fifth lens group 50 is a focusing lens group which moves toward the image when focusing from infinity to a close distance is performed.

It is possible that the lens-group moving paths can be designed to integrally move the positive third lens group 30 and the negative fifth lens group 50 upon focusing. Due to this arrangement, focusing sensitivity can be reduced, so that manufacture of the zoom lens system can be facilitated.

More specifically, as shown in each of the embodiments of FIGS. 1 (3), 5 (7), 9 (11), 13 (15), 17 (19) and 21 (23), the positive first lens group 10 includes a negative lens element, a positive lens element and another positive lens element, in this order from the object.

The negative second lens group 20 includes a negative lens element, cemented lens elements having a negative lens element and a positive lens element, and cemented lens elements having a negative lens element and a positive lens element, in this order from the object.

The positive third lens group 30 includes a positive lens element, cemented lens elements having a positive lens element and a negative lens element, and cemented lens elements having a negative lens element and a positive lens element, in this order from the object.

The positive fourth lens group 40 includes a positive lens element, another positive lens element, and cemented lens elements having a positive lens element and a negative lens element, in this order from the object.

The negative fifth lens group 50 includes a negative lens element, another negative lens element, and a positive lens element, in this order from the object.

In the embodiments, the negative refractive power in the high zoom-ratio zoom lens system is mainly distributed over the negative second lens group 20 and the negative fifth lens group 50.

As explained, the negative second lens group 20 preferably includes a negative lens element, cemented lens elements having a negative lens element and a positive lens element, and cemented lens elements having a negative lens element and a positive lens element, in this order from the object; and, the negative fifth lens group 50 preferably includes a negative lens element, another negative lens element, and a positive lens element, in this order from the object.

Condition (1) concerns the ratio of the focal length (the ratio of refractive power) of the positive first lens group 10 to that of the negative second lens group 20.

If f1/|f2| exceeds the upper limit of condition (1), the negative refractive power of the second lens group 20 becomes too strong, so that the correcting of distortion and coma becomes difficult especially at the short focal length extremity.

If f1/|f2| exceeds the lower limit of condition (1), the positive refractive power of the first lens group 10 becomes too strong, so that the correcting of spherical aberration and coma becomes difficult especially at the long focal length extremity.

Condition (2) concerns the ratio of the focal length (the ratio of refractive power) of the positive third lens group 30 to that of the positive fourth lens group 40.

If f3/f4 exceeds the upper limit of condition (2), the positive refractive power of the fourth lens group 40 becomes too strong, so that coma tends to occur at the long focal length extremity.

If f3/f4 exceeds the lower limit of condition (2), the positive refractive power of the fourth lens group 40 becomes too weak, so that the correcting of field curvature cannot adequately be made.

Condition (3) concerns the ratio of the focal length (the ratio of refractive power) of the positive first lens group 10 to that of the entire zoom lens system at the short focal length extremity.

If f1/fw exceeds the upper limit of condition (3), the positive refractive power of the first lens group 10 becomes too weak, so that the overall zoom lens system becomes larger.

If f1/fw exceeds the lower limit of condition (3), the positive refractive power of the first lens group 10 becomes too strong, so that spherical aberration and coma largely occur especially at the long focal length extremity.

Condition (4) concerns the ratio of the back focal distance to the focal length of the entire zoom lens system at the short focal length extremity.

If fBw/fw exceeds the upper limit of condition (4), the combined negative refractive power of the positive first lens group 10 and the negative second lens group 20 (constituting a front lens group) becomes strong, and the combined positive refractive power of the positive third lens group 30, the positive fourth lens group 40 and the negative fifth lens group 50 (constituting a rear lens group) becomes strong. Consequently, the correcting of aberrations becomes difficult, and further miniaturization also becomes difficult.

If fBw/fw exceeds the lower limit of condition (4), the back focal distance necessary for an SLR camera at the short focal length extremity cannot be secured.

Condition (5) concerns the zoom ratio of the negative second lens group 20 to that of the entire zoom lens system.

If Z2/Z exceeds the upper limit of condition (5), the negative second lens group 20 largely contributes to zooming, so that aberration fluctuations due to zooming increase.

If Z2/Z exceeds the lower limit of condition (5), the negative second lens group 20 less contributes to zooming, which is disadvantageous for further miniaturization.

Condition (6) concerns the lateral magnification, at the long focal length extremity, of the negative fifth lens group 50 which constitutes a focusing lens group.

If m5t exceeds the upper limit of condition (6), the focusing sensitivity of the negative fifth lens group 50 becomes higher. Consequently, aberration fluctuations upon focusing tends to become larger.

If m5t exceeds the lower limit of condition (6), the focusing sensitivity of the negative fifth lens group 50 becomes lower. Consequently, the traveling distance of the negative fifth lens group 50 upon focusing becomes undesirably longer.

Condition (7) concerns the ratio of the focal length (the ratio of refractive power) of the negative fifth lens group 50 to that of the negative second lens group 20.

If f5/f2 exceeds the upper limit of condition (7), the negative refractive power of the second lens group 20 becomes too strong, so that the correcting of distortion and astigmatism at the short focal length extremity becomes difficult.

If f5/f2 exceeds the lower limit of condition (7), the negative refractive power of the second lens group 20 becomes too weak. Consequently, spherical aberration and coma at the long focal length extremity are undercorrected, and securing the back focal distance at the short focal length extremity becomes difficult.

Condition (8) concerns the ratio of the focal length (the ratio of refractive power) of the negative fifth lens group 50 to the focal length of the entire zoom lens system at the short focal length extremity.

If |f5|/fw exceeds the upper limit of condition (8), the negative refractive power of the fifth lens group 50 becomes too weak, so that distortion at the short focal length extremity is undercorrected.

If |f5|/fw exceeds the lower limit of condition (8), the negative refractive power of the fifth lens group 50 becomes too strong, so that spherical aberration at the long focal length extremity becomes overcorrected.

The negative fifth lens group 50 preferably includes three lens element, e.g., a negative lens element, another negative lens element, and a positive lens element, in this order from the object.

An increase of the number of lens elements is advantageous of the correcting of aberrations; however, quick focusing becomes difficult.

If the number of lens elements is one or two, aberrations are undercorrected.

In the high zoom-ratio zoom lens system of the present invention, when focusing is being performed by the negative fifth lens group 50, the correcting of aberrations at a closer distance can be more suitably made by secondarily (dependently) moving other lens groups. Namely, by secondarily moving one or more lens groups other than the negative fifth lens group 50, aberration fluctuations depending on the photographing distance can be adequately corrected, and the traveling distance of the focusing lens group (i.e., the negative fifth lens group 50) in the optical axis direction can be reduced. In this case, the negative fifth lens group 50 preferably satisfies the following condition:

$$|\Delta X'/\Delta X| < 0.3 \qquad (9)$$

wherein $\Delta X$ designates the traveling distance of the negative fifth lens group 50 in the optical axis direction upon focusing; and $\Delta X'$ designates the traveling distance of at least one lens group, other than the negative fifth lens group 50, in the optical axis direction upon focusing.

Condition (9) concerns the ratio of the traveling distance of the other lens group(s) to that of the negative fifth lens group 50 upon focusing.

If $|\Delta X'/\Delta X|$ exceeds the upper limit of condition (9), the influence of the secondary (auxiliary) focusing lens group becomes too strong. Consequently, the balance of refractive power over the entire zoom lens system is lost, and the correcting of aberrations cannot suitably be made.

In the embodiments, only the negative fifth lens group 50 is used as a focusing lens group, and no secondary (auxiliary) focusing lens group is employed in any of the embodiments.

On the other hand, in each of the embodiments, if an attempt is made to move the positive fourth lens group 40 as a secondary focusing lens group, spherical aberration and field curvature can be adequately corrected, especially at the long focal length extremity.

More specifically, when the positive fourth lens group 40 and the negative fifth lens group 50 are arranged to function as the focusing lens groups, the correcting of aberrations an be suitably carried out by defining the traveling distances of these lens group as follows:

at the short focal length side:|ΔX'/ΔX|=0.0 (i.e., the positive fourth lens group 40 does not move); and at the long focal length side:|ΔX'/ΔX|=0.1 through 0.2.

Specific numerical data of the embodiments will be described hereinafter.

In the diagrams of spherical aberration and the sine condition, SA designates spherical aberration, and SC designates the sine condition.

In the diagrams of chromatic aberration (axial chromatic aberration) represented by spherical aberration, the solid line and the two types of dotted lines respectively indicate spherical aberration with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

In the tables, FNO. designates the F-number, f designates the focal length of the entire zoom lens system, W designates the half angle-of-view (°), fB designates the back focal distance, r designates the radius of curvature, d designates the lens-element thickness or a distance between lens elements (lens groups), $N_d$ designates the refractive index of the d-line, and ν designates the Abbe number.

The values of the F-number, the focal length of the entire zoom lens system (f), the half angle-of-view (°) (W) and the back focal distance (fB), and the values of the lens-element thickness or a distance between lens elements (lens groups) (d) are indicated in the order of the short focal length extremity, an intermediate focal length and the long focal length extremity.

Embodiment 1

FIG. 1 shows the lens arrangement of the first embodiment of the high zoom-ratio zoom lens system according to the present invention at the short focal length extremity. FIGS. 2A through 2E show aberrations occurred in the lens arrangement shown in FIG. 1.

FIG. 3 shows the lens arrangement of the first embodiment of the high zoom-ratio zoom lens system at the long focal length extremity. FIGS. 4A through 4E show aberrations occurred in the lens arrangement shown in FIG. 3.

Table 1 shows the numerical data of the first embodiment.

The high zoom-ratio zoom lens system of the present invention, as shown the lens-group moving paths of FIG. 25, includes, a positive first lens group 10, a negative second lens group 20, a positive third lens group 30, a positive fourth lens group 40, and a negative fifth lens group 50, in this order from the object.

The positive first lens group 10 includes a negative meniscus lens element having the convex surface facing toward the object, a bi-convex positive lens element, and a positive meniscus lens element having the convex surface facing toward the object, in this order from the object.

The negative second lens group 20 includes a negative meniscus lens element having the convex surface facing toward to the object, cemented lens elements having a negative meniscus lens element having the convex surface facing toward the object and a positive meniscus lens element having the convex surface facing toward the object, and cemented lens elements having a bi-concave negative lens element and a bi-convex positive lens element, in this order from the object.

The positive third lens group 30 includes a bi-convex positive lens element, cemented lens elements having a bi-convex positive lens element and a negative meniscus lens element having the convex surface facing toward the image, and cemented lens elements having a bi-concave negative lens element and a positive meniscus lens element having the convex surface facing toward the object, in this order from the object.

The positive fourth lens group 40 includes a positive meniscus lens element having the convex surface facing toward the image, a bi-convex positive lens element, and cemented lens elements having a bi-convex positive lens element and a bi-concave negative lens element, in this order from the object.

The negative fifth lens group 50 includes a bi-concave negative lens element, a negative meniscus lens element having the convex surface facing toward the object, and a bi-convex positive lens element, in this order from the object. The negative fifth lens group 50 is arranged to function as a focusing lens group.

Table 1 shows the numerical data of the second embodiment.

No aspherical lens surface is employed in any of the embodiments.

The diaphragm S is provided 1.00 in front (on the object side) of the positive third lens group 30 (surface No. 15).

TABLE 1

FNO. = 1:3.6-5.4-5.8
f = 25.75-100.00-340.01 (Zoom Ratio = 13.20)
W = 29.7-7.9-2.4
fB = 37.00-67.05-79.32

| Surf. No. | r | d | Nd | ν |
|---|---|---|---|---|
| 1 | 147.289 | 2.80 | 1.83400 | 37.2 |
| 2 | 73.373 | 0.10 | | |
| 3 | 73.067 | 9.90 | 1.49700 | 81.6 |
| 4 | −401.550 | 0.10 | | |
| 5 | 67.171 | 7.80 | 1.49700 | 81.6 |
| 6 | 316.145 | 1.50-43.53-76.18 | | |
| 7 | 46.523 | 1.30 | 1.83400 | 37.2 |
| 8 | 21.484 | 4.20 | | |
| 9 | 250.065 | 1.20 | 1.77250 | 49.6 |
| 10 | 40.012 | 2.90 | 1.74077 | 27.8 |
| 11 | 89.138 | 5.00 | | |
| 12 | −29.753 | 1.30 | 1.77250 | 49.6 |
| 13 | 24.120 | 3.50 | 1.80518 | 25.4 |
| 14 | −183.567 | 39.68-16.92-3.00 | | |
| 15 | 28.031 | 3.60 | 1.59240 | 68.3 |
| 16 | −69.503 | 0.10 | | |
| 17 | 51.004 | 3.50 | 1.49700 | 81.6 |
| 18 | −35.596 | 1.20 | 1.83400 | 37.2 |
| 19 | −1912.263 | 2.00 | | |
| 20 | −36.262 | 1.20 | 1.74400 | 44.8 |
| 21 | 20.644 | 3.10 | 1.80100 | 35.0 |
| 22 | 95.966 | 9.35-5.44-1.86 | | |
| 23 | −3510.212 | 6.30 | 1.53172 | 48.9 |
| 24 | −29.000 | 1.20 | | |
| 25 | 64.665 | 3.00 | 1.61800 | 63.4 |
| 26 | −151.192 | 0.10 | | |
| 27 | 28.441 | 5.30 | 1.48749 | 70.2 |
| 28 | −27.016 | 1.20 | 1.80100 | 35.0 |
| 29 | 120.479 | 5.92-7.51-1.30 | | |
| 30 | −96.004 | 1.20 | 1.80400 | 46.6 |
| 31 | 38.687 | 1.30 | | |
| 32 | 1678.734 | 1.20 | 1.80610 | 40.9 |

TABLE 1-continued

FNO. = 1:3.6-5.4-5.8
f = 25.75-100.00-340.01 (Zoom Ratio = 13.20)
W = 29.7-7.9-2.4
fB = 37.00-67.05-79.32

| Surf. No. | r | d | Nd | ν |
|---|---|---|---|---|
| 33 | 30.259 | 0.10 | | |
| 34 | 28.292 | 4.10 | 1.67270 | 32.1 |
| 35 | −49.617 | | | |

Embodiment 2

FIG. 5 shows the lens arrangement of a second embodiment of the high zoom-ratio zoom lens system according to the present invention at the short focal length extremity. FIGS. 6A through 6E show aberrations occurred in the lens arrangement shown in FIG. 5.

Figure 7:
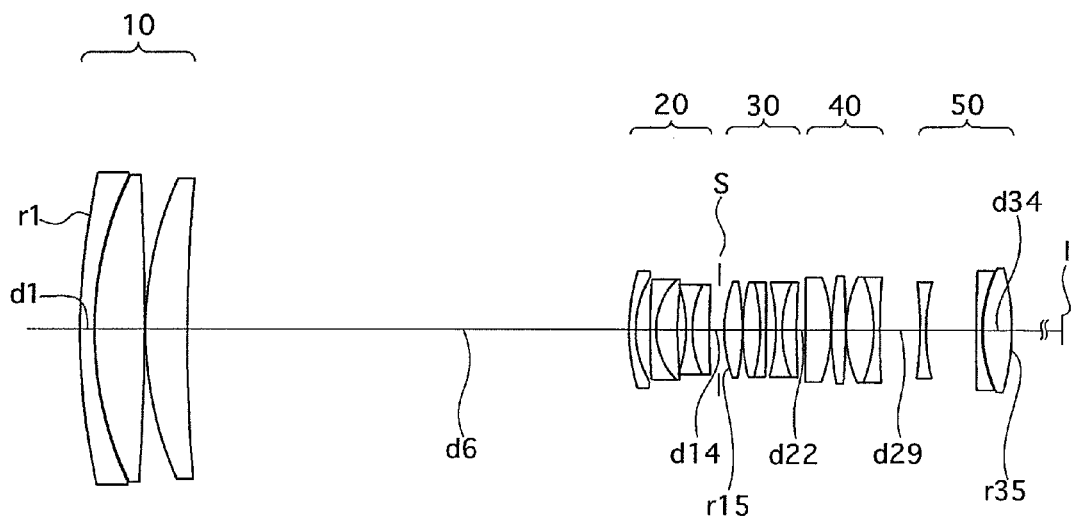
FIG. 7 shows the lens arrangement of the second embodiment of the high zoom-ratio zoom lens system at the long focal length extremity.
Figure 8A:
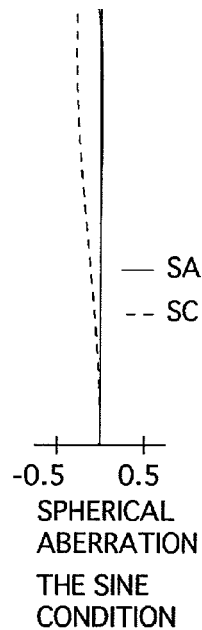
FIGS. 8A, 8B, 8C, 8D and 8E show aberrations occurred in the lens arrangement shown in FIG. 7.
Figure 8B:
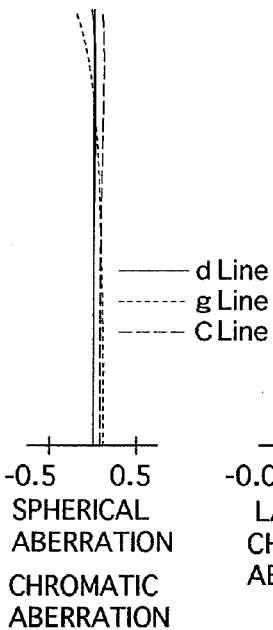
Figure 8C:
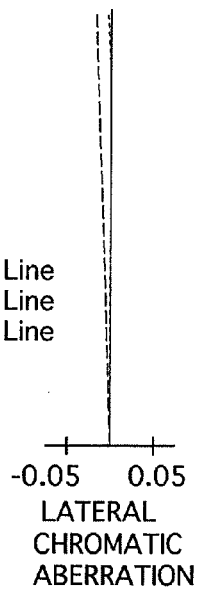
Figure 8D:
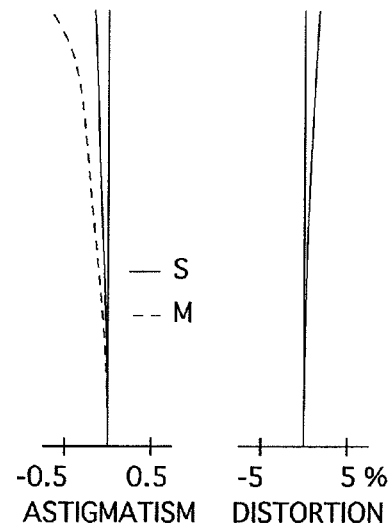
Figure 8E:
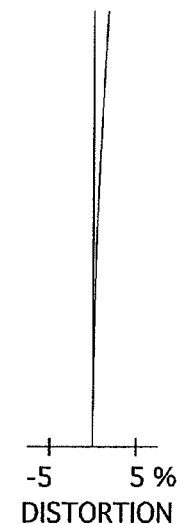

FIG. 7 shows the lens arrangement of the second embodiment of the high zoom-ratio zoom lens system at the long focal length extremity. FIGS. 8A through 8E show aberrations occurred in the lens arrangement shown in FIG. 7.

Table 2 shows the numerical data of the second embodiment.

The basic lens arrangement of the second embodiment is the same as that of the first embodiment except that the most image-side lens element of the negative second lens group 20 includes a positive meniscus lens element having the convex surface facing toward the object.

The diaphragm S is provided 1.00 in front (on the object side) of the positive third lens group 30 (surface No. 15).

TABLE 2

FNO. = 1:3.6-5.2-5.8
f = 25.75-100.00-340.00 (Zoom Ratio = 13.20)
W = 30.5-8.0-2.4
fB = 38.50-74.19-63.35

| Surf. No. | r | d | Nd | ν |
|---|---|---|---|---|
| 1 | 146.247 | 2.80 | 1.83400 | 37.2 |
| 2 | 73.784 | 0.10 | | |
| 3 | 72.161 | 10.00 | 1.49700 | 81.6 |
| 4 | −493.592 | 0.20 | | |
| 5 | 75.013 | 8.30 | 1.49700 | 81.6 |
| 6 | 335.667 | 1.50-55.17-88.91 | | |
| 7 | 40.893 | 1.30 | 1.80400 | 46.6 |
| 8 | 21.031 | 2.90 | | |
| 9 | 161.854 | 1.20 | 1.81600 | 46.6 |
| 10 | 14.699 | 4.20 | 1.71736 | 29.5 |
| 11 | 70.170 | 1.80 | | |
| 12 | −27.984 | 1.20 | 1.77250 | 49.6 |
| 13 | 21.330 | 3.40 | 1.80518 | 25.4 |
| 14 | 160.769 | 27.60-13.85-3.00 | | |
| 15 | 28.754 | 3.60 | 1.60300 | 65.5 |
| 16 | −56.586 | 0.10 | | |
| 17 | 39.606 | 3.60 | 1.49700 | 81.6 |
| 18 | −37.850 | 1.20 | 1.80610 | 33.3 |
| 19 | −316.542 | 2.00 | | |
| 20 | −35.723 | 1.20 | 1.75500 | 52.3 |
| 21 | 24.679 | 2.90 | 1.74000 | 28.3 |
| 22 | 123.454 | 10.39-5.18-1.86 | | |
| 23 | −1655.260 | 5.20 | 1.51633 | 64.1 |
| 24 | −29.836 | 0.10 | | |
| 25 | 59.743 | 2.90 | 1.61800 | 63.4 |
| 26 | −138.660 | 0.10 | | |
| 27 | 26.626 | 5.60 | 1.48749 | 70.2 |
| 28 | −28.045 | 1.20 | 1.80518 | 25.4 |
| 29 | 155.895 | 1.90-3.03-8.07 | | |
| 30 | −75.649 | 1.20 | 1.81600 | 46.6 |

TABLE 2-continued

FNO. = 1:3.6-5.2-5.8
f = 25.75-100.00-340.00 (Zoom Ratio = 13.20)
W = 30.5-8.0-2.4
fB = 38.50-74.19-63.35

| Surf. No. | r | d | Nd | ν |
|---|---|---|---|---|
| 31 | 40.903 | 10.03 | | |
| 32 | 388.307 | 1.20 | 1.80400 | 46.6 |
| 33 | 29.107 | 0.20 | | |
| 34 | 29.003 | 6.00 | 1.67270 | 32.1 |
| 35 | −44.458 | | | |

Embodiment 3

FIG. 9 shows the lens arrangement of a third embodiment of the high zoom-ratio zoom lens system according to the present invention at the short focal length extremity. FIGS. 10A through 10E show aberrations occurred in the lens arrangement shown in FIG. 9.

FIG. 11 shows the lens arrangement of the third embodiment of the high zoom-ratio zoom lens system at the long focal length extremity. FIGS. 12A through 12E show aberrations occurred in the lens arrangement shown in FIG. 11.

Table 3 shows the numerical data of the third embodiment.

The basic lens arrangement of the third embodiment is the same as that of the first embodiment except that the most object-side lens element of the positive fourth lens group 40 includes a bi-convex positive lens element.

The diaphragm S is provided 1.00 in front (on the object side) of the positive third lens group 30 (surface No. 15).

TABLE 3

FNO. = 1:3.6-5.1-5.6
f = 25.75-100.00-340.01 (Zoom Ratio = 13.20)
W = 30.0-8.0-2.4
fB = 39.90-61.83-71.82

| Surf. No. | r | d | Nd | ν |
|---|---|---|---|---|
| 1 | 150.426 | 2.80 | 1.83400 | 37.2 |
| 2 | 73.856 | 0.10 | | |
| 3 | 72.557 | 10.00 | 1.49700 | 81.6 |
| 4 | −498.431 | 0.10 | | |
| 5 | 70.555 | 8.40 | 1.49700 | 81.6 |
| 6 | 300.621 | 1.50-51.94-83.84 | | |
| 7 | 41.758 | 1.30 | 1.80400 | 46.6 |
| 8 | 21.440 | 4.40 | | |
| 9 | 198.799 | 1.20 | 1.78800 | 47.4 |
| 10 | 20.146 | 7.00 | 1.72151 | 29.2 |
| 11 | 79.145 | 2.70 | | |
| 12 | −28.646 | 1.20 | 1.77250 | 49.6 |
| 13 | 26.899 | 3.50 | 1.80518 | 25.4 |
| 14 | −932.936 | 34.51-14.84-3.00 | | |
| 15 | 28.891 | 3.60 | 1.60311 | 60.7 |
| 16 | −70.068 | 0.10 | | |
| 17 | 50.337 | 3.50 | 1.49700 | 81.6 |
| 18 | −35.490 | 1.20 | 1.85026 | 32.3 |
| 19 | −573.267 | 2.00 | | |
| 20 | −35.977 | 1.20 | 1.74320 | 49.3 |
| 21 | 20.806 | 3.20 | 1.74950 | 35.3 |
| 22 | 122.185 | 8.60-5.16-1.86 | | |
| 23 | 1230.810 | 5.40 | 1.53113 | 62.4 |
| 24 | −28.521 | 0.20 | | |
| 25 | 60.897 | 2.90 | 1.61800 | 63.4 |
| 26 | −136.558 | 0.10 | | |
| 27 | 27.440 | 6.70 | 1.48749 | 70.2 |
| 28 | −27.871 | 1.20 | 1.80100 | 35.0 |
| 29 | 127.430 | 2.75-6.79-5.18 | | |
| 30 | −87.512 | 1.20 | 1.80400 | 46.6 |
| 31 | 36.923 | 5.30 | | |

TABLE 3-continued

FNO. = 1:3.6-5.1-5.6
f = 25.75-100.00-340.01 (Zoom Ratio = 13.20)
W = 30.0-8.0-2.4
fB = 39.90-61.83-71.82

| Surf. No. | r | d | Nd | ν |
|---|---|---|---|---|
| 32 | 1651.831 | 1.20 | 1.80440 | 39.6 |
| 33 | 28.689 | 0.10 | | |
| 34 | 27.424 | 4.90 | 1.66680 | 33.0 |
| 35 | −44.982 | | | |

Embodiment 4

FIG. 13 shows the lens arrangement of a fourth embodiment of the high zoom-ratio zoom lens system according to the present invention at the short focal length extremity. FIGS. 14A through 14E show aberrations occurred in the lens arrangement shown in FIG. 13.

FIG. 15 shows the lens arrangement of the fourth embodiment of the high zoom-ratio zoom lens system at the long focal length extremity. FIGS. 16A through 16E show aberrations occurred in the lens arrangement shown in FIG. 15.

Table 4 shows the numerical data of the fourth embodiment.

The basic lens arrangement of the fourth embodiment is the same as that of the first embodiment.

The diaphragm S is provided 1.00 in front (on the object side) of the positive third lens group 30 (surface No. 15).

TABLE 4

FNO. = 1:3.6-5.1-5.8
f = 25.75-100.00-340.00 (Zoom Ratio = 13.20)
W = 30.1-8.0-2.4
fB = 39.16-65.47-77.00

| Surf. No. | r | d | Nd | ν |
|---|---|---|---|---|
| 1 | 150.196 | 2.80 | 1.83400 | 37.2 |
| 2 | 73.725 | 0.10 | | |
| 3 | 72.274 | 10.50 | 1.49700 | 81.6 |
| 4 | −515.390 | 0.20 | | |
| 5 | 70.960 | 8.00 | 1.49700 | 81.6 |
| 6 | 282.274 | 1.50-52.65-86.83 | | |
| 7 | 43.695 | 1.30 | 1.80400 | 46.6 |
| 8 | 21.103 | 4.10 | | |
| 9 | 217.727 | 1.20 | 1.78800 | 47.4 |
| 10 | 20.948 | 5.00 | 1.72825 | 28.5 |
| 11 | 85.392 | 3.40 | | |
| 12 | −28.656 | 1.20 | 1.77250 | 49.6 |
| 13 | 27.094 | 3.40 | 1.80518 | 25.4 |
| 14 | −518.861 | 34.04-14.77-3.00 | | |
| 15 | 29.598 | 3.80 | 1.60311 | 60.7 |
| 16 | −64.088 | 0.10 | | |
| 17 | 44.491 | 3.70 | 1.49700 | 81.6 |
| 18 | −41.158 | 1.20 | 1.78472 | 25.7 |
| 19 | −381.981 | 2.00 | | |
| 20 | −36.528 | 1.20 | 1.72342 | 38.0 |
| 21 | 19.398 | 5.00 | 1.76182 | 26.6 |
| 22 | 113.323 | 10.06-5.17-1.86 | | |
| 23 | −851.956 | 4.60 | 1.51742 | 52.4 |
| 24 | −30.368 | 0.10 | | |
| 25 | 64.183 | 2.70 | 1.61800 | 63.4 |
| 26 | −169.361 | 0.10 | | |
| 27 | 27.208 | 5.20 | 1.48749 | 70.2 |
| 28 | −24.991 | 1.20 | 1.80100 | 35.0 |
| 29 | 125.870 | 2.00-5.13-2.54 | | |
| 30 | −85.123 | 1.20 | 1.80400 | 46.6 |
| 31 | 39.006 | 2.00 | | |
| 32 | 559.130 | 1.20 | 1.80610 | 40.9 |
| 33 | 30.043 | 0.10 | | |

TABLE 4-continued

FNO. = 1:3.6-5.1-5.8
f = 25.75-100.00-340.00 (Zoom Ratio = 13.20)
W = 30.1-8.0-2.4
fB = 39.16-65.47-77.00

| Surf. No. | r | d | Nd | ν |
|---|---|---|---|---|
| 34 | 27.920 | 5.00 | 1.67270 | 32.1 |
| 35 | −48.992 | | | |

Embodiment 5

Figure 17:
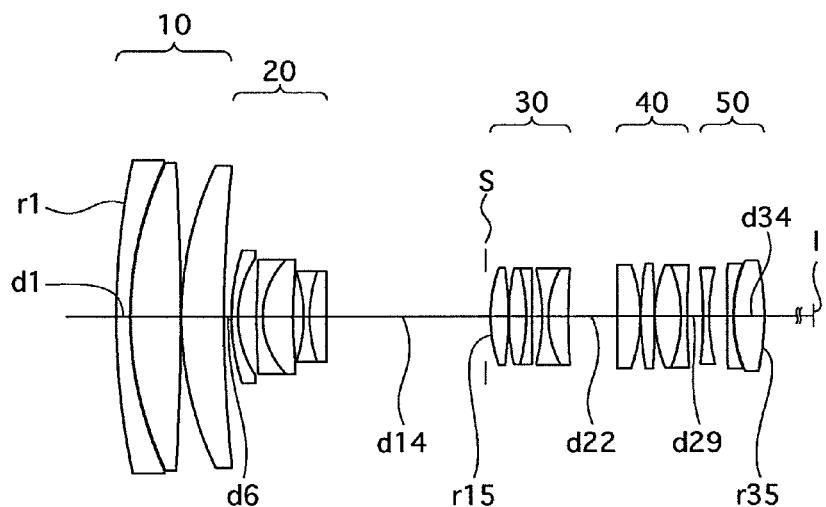
FIG. 17 shows a lens arrangement of a fifth embodiment of the high zoom-ratio zoom lens system according to the present invention at the short focal length extremity.
Figures 18A, 18B, 18C, 18D, 18E:
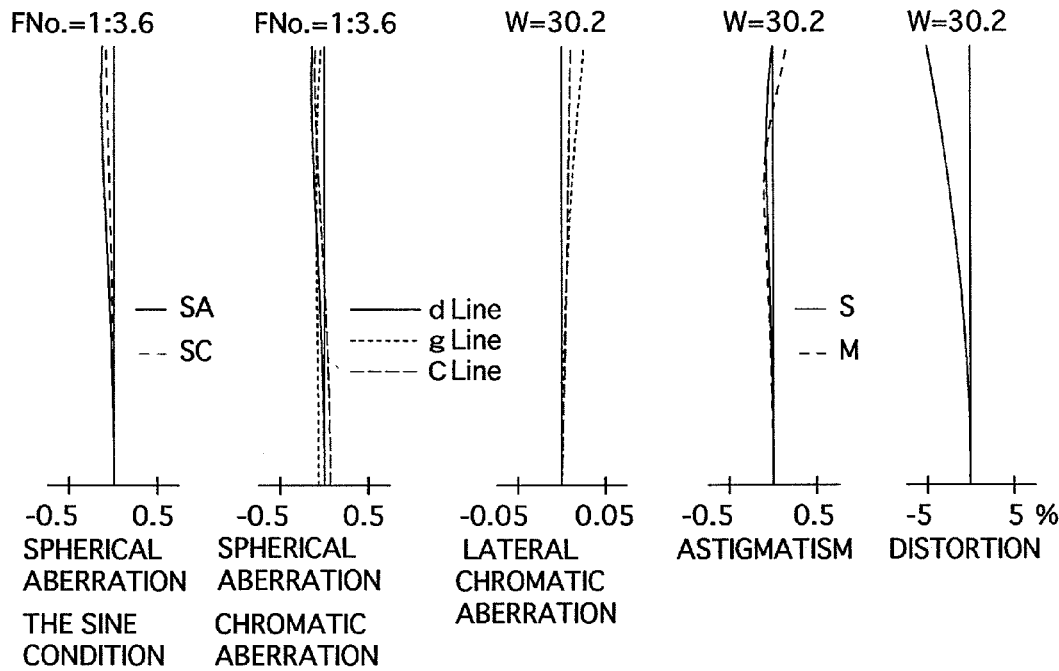
FIGS. 18A, 18B, 18C, 18D and 18E show aberrations occurred in the lens arrangement shown in FIG. 17.

FIG. 17 shows the lens arrangement of a fifth embodiment of the high zoom-ratio zoom lens system according to the present invention at the short focal length extremity. FIGS. 18A through 18E show aberrations occurred in the lens arrangement shown in FIG. 17.

FIG. 19 shows the lens arrangement of the fifth embodiment of the high zoom-ratio zoom lens system at the long focal length extremity. FIGS. 20A through 20E show aberrations occurred in the lens arrangement shown in FIG. 19.

Table 5 shows the numerical data of the fifth embodiment.

The basic lens arrangement of the fifth embodiment is the same as that of the first embodiment.

The diaphragm S is provided 1.00 in front (on the object side) of the positive third lens group 30 (surface No. 15).

TABLE 5

FNO. = 1:3.6-5.2-5.8
f = 25.75-100.03-340.02 (Zoom Ratio = 13.20)
W = 30.2-8.0-2.4
fB = 39.51-67.95-75.57

| Surf. No. | r | d | Nd | ν |
|---|---|---|---|---|
| 1 | 150.874 | 2.80 | 1.83400 | 37.2 |
| 2 | 73.855 | 0.10 | | |
| 3 | 72.416 | 9.93 | 1.49700 | 81.6 |
| 4 | −513.158 | 0.15 | | |
| 5 | 71.026 | 8.50 | 1.49700 | 81.6 |
| 6 | 287.739 | 1.50-52.50-86.12 | | |
| 7 | 42.494 | 1.30 | 1.80400 | 46.6 |
| 8 | 21.430 | 3.77 | | |
| 9 | 224.250 | 1.20 | 1.79570 | 47.3 |
| 10 | 16.433 | 6.08 | 1.71341 | 30.1 |
| 11 | 82.413 | 2.11 | | |
| 12 | −29.013 | 1.20 | 1.77250 | 49.6 |
| 13 | 27.892 | 3.42 | 1.80518 | 25.4 |
| 14 | −732.459 | 33.01-14.71-3.00 | | |
| 15 | 28.996 | 3.64 | 1.60311 | 60.7 |
| 16 | −67.535 | 0.10 | | |
| 17 | 46.626 | 3.52 | 1.49700 | 81.6 |
| 18 | −38.052 | 1.20 | 1.80026 | 30.3 |
| 19 | −567.623 | 2.00 | | |
| 20 | −36.211 | 1.20 | 1.74179 | 42.8 |
| 21 | 20.506 | 4.06 | 1.76433 | 29.3 |
| 22 | 127.148 | 9.81-5.70-1.86 | | |
| 23 | −7022.530 | 4.81 | 1.52636 | 58.4 |
| 24 | −29.205 | 0.10 | | |
| 25 | 62.972 | 2.70 | 1.61800 | 63.4 |
| 26 | −155.628 | 0.10 | | |
| 27 | 27.452 | 5.20 | 1.48749 | 70.2 |
| 28 | −27.130 | 1.20 | 1.80276 | 32.1 |
| 29 | 129.952 | 3.20-5.85-5.68 | | |
| 30 | −88.356 | 1.20 | 1.80400 | 46.6 |
| 31 | 39.528 | 3.60 | | |
| 32 | 572.880 | 1.20 | 1.80610 | 40.9 |
| 33 | 29.849 | 0.10 | | |
| 34 | 28.392 | 6.17 | 1.67422 | 31.2 |
| 35 | −49.823 | | | |

Embodiment 6

FIG. 21 shows the lens arrangement of a sixth embodiment of the high zoom-ratio zoom lens system according to the present invention at the short focal length extremity. FIGS. 22A through 22E show aberrations occurred in the lens arrangement shown in FIG. 21.

FIG. 23 shows the lens arrangement of the sixth embodiment of the high zoom-ratio zoom lens system at the long focal length extremity. FIGS. 24A through 24E show aberrations occurred in the lens arrangement shown in FIG. 23.

Table 6 shows the numerical data of the sixth embodiment.

The basic lens arrangement of the sixth embodiment is the same as that of the first embodiment except that the most object-side lens element of the positive fourth lens group 40 includes a bi-convex positive lens element, and the middle lens element of the negative fifth lens group 50 includes a bi-concave negative lens element.

The diaphragm S is provided 1.00 in front (on the object side) of the positive third lens group 30 (surface No. 15).

TABLE 6

FNO. = 1:3.6-5.3-5.8
f = 25.75-100.00-340.01 (Zoom Ratio = 13.20)
W = 29.9-8.0-2.4
fB = 37.96-64.82-76.63

| Surf. No. | r | d | Nd | ν |
|---|---|---|---|---|
| 1 | 147.711 | 2.80 | 1.83400 | 37.2 |
| 2 | 72.861 | 0.10 | | |
| 3 | 73.688 | 9.90 | 1.49700 | 81.6 |
| 4 | −482.747 | 0.10 | | |
| 5 | 62.760 | 7.80 | 1.49700 | 81.6 |
| 6 | 269.944 | 1.50-43.54-75.55 | | |
| 7 | 51.344 | 1.30 | 1.83400 | 37.2 |
| 8 | 23.075 | 5.37 | | |
| 9 | 487.625 | 1.20 | 1.77250 | 49.6 |
| 10 | 32.613 | 2.90 | 1.74067 | 27.3 |
| 11 | 105.151 | 8.03 | | |
| 12 | −29.576 | 1.30 | 1.77250 | 49.6 |
| 13 | 28.452 | 3.50 | 1.80518 | 25.4 |
| 14 | −131.645 | 42.27-17.08-3.00 | | |
| 15 | 28.880 | 3.60 | 1.59240 | 68.3 |
| 16 | −65.446 | 0.10 | | |
| 17 | 51.099 | 3.50 | 1.49700 | 81.6 |
| 18 | −35.322 | 1.20 | 1.83400 | 37.2 |
| 19 | −3963.409 | 2.00 | | |
| 20 | −35.933 | 1.20 | 1.74382 | 45.2 |
| 21 | 20.754 | 3.10 | 1.80100 | 35.0 |
| 22 | 100.751 | 7.67-4.33-1.86 | | |
| 23 | 2126.391 | 8.34 | 1.53953 | 47.2 |
| 24 | −28.862 | 1.50 | | |
| 25 | 60.775 | 2.98 | 1.61800 | 63.4 |
| 26 | −128.808 | 0.10 | | |
| 27 | 27.339 | 5.50 | 1.48749 | 70.2 |
| 28 | −27.389 | 1.20 | 1.80134 | 32.8 |
| 29 | 135.247 | 3.90-5.90-2.00 | | |
| 30 | −78.068 | 1.20 | 1.80400 | 46.6 |
| 31 | 35.962 | 1.30 | | |
| 32 | −358.272 | 1.20 | 1.80610 | 40.9 |
| 33 | 30.495 | 0.10 | | |
| 34 | 27.210 | 4.10 | 1.67270 | 32.1 |
| 35 | −60.523 | | | |

The numerical values of each condition for each embodiment are shown in Table 7.

TABLE 7

| | Embod. 1 | Embod. 2 | Embod. 3 |
|---|---|---|---|
| Cond.(1) | 6.332 | 9.066 | 7.660 |
| Cond.(2) | 3.129 | 2.042 | 3.509 |

TABLE 7-continued

| Cond.(3) | 4.752 | 5.215 | 5.168 |
|---|---|---|---|
| Cond.(4) | 1.437 | 1.495 | 1.550 |
| Cond.(5) | 0.526 | 0.496 | 0.481 |
| Cond.(6) | 2.426 | 2.200 | 2.416 |
| Cond.(7) | 3.206 | 5.857 | 3.705 |
| Cond.(8) | 2.406 | 3.370 | 2.500 |

| | Embod. 4 | Embod. 5 | Embod. 6 |
|---|---|---|---|
| Cond.(1) | 7.807 | 7.926 | 6.342 |
| Cond.(2) | 1.809 | 2.374 | 3.546 |
| Cond.(3) | 5.284 | 5.270 | 4.803 |
| Cond.(4) | 1.521 | 1.495 | 1.474 |
| Cond.(5) | 0.473 | 0.456 | 0.507 |
| Cond.(6) | 2.356 | 2.355 | 2.997 |
| Cond.(7) | 3.774 | 4.005 | 2.150 |
| Cond.(8) | 2.554 | 2.663 | 1.628 |

As can be understood from Table 7, the first through sixth embodiments satisfy conditions (1) through (8). Furthermore, as can be understood from the aberration diagrams, the aberrations are suitably corrected.

According to the present invention, a high zoom-ratio zoom lens system of five lens groups (i.e., a positive lens group, a negative lens group, a positive lens group, a positive lens group, and a negative lens group, in this order from the object) with superior optical quality can be attained:

(i) a zoom ratio exceeding 13;

(ii) a focal length of 350 mm at the long focal length extremity;

(iii) an F-number of 5.6; and (iv) an angle-of-view of approximately 60° at the short focal length extremity.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A high zoom-ratio zoom lens system of five lens groups comprises a positive first lens group, a negative second lens group, a positive third lens group, a positive fourth lens group, and a negative fifth lens group, in this order from an object, wherein upon zooming from the short focal length extremity to the long focal length extremity, a distance between said positive first lens group and said negative second lens group increases, and a distance between said negative second lens group and said positive third lens group decreases; and wherein said high zoom-ratio zoom lens system satisfies the following conditions:

$$5.5 < f1/|f2| < 10.0 \ (f2<0)$$

$$1.7 < f3/f4 < 4.0$$

wherein f1 designates the focal length of said positive first lens group;

f2 designates the focal length of said negative second lens group;

f3 designates the focal length of said positive third lens group;

f4 designates the focal length of said positive fourth lens group.

2. The high zoom-ratio zoom lens system according to claim 1, satisfying the following conditions:

$$4.5<f1/fw<10.0$$

$$1.4<fBw/fw<2.0$$

wherein f1 designates the focal length of said positive first lens group;

fw designates the focal length of the entire zoom lens system at the short focal length extremity, and fBw designates the back focal distance at the short focal length extremity.

3. The high zoom-ratio zoom lens system according to claim 1, satisfying the following conditions:

$$0.4<Z2/Z<0.6$$

wherein

Z designates the zoom ratio of the entire zoom lens system (=ft/fw);

Z2 designates the zoom ratio of said negative second lens group (=m2t/m2w);

ft designates the focal length of the entire zoom lens system at the long focal length extremity;

fw designates the focal length of the entire zoom lens system at the short focal length extremity, m2w designates the lateral magnification of said negative second lens group at the short focal length extremity; and m2t designates the lateral magnification of said negative second lens group at the long focal length extremity.

4. The high zoom-ratio zoom lens system according to claim 1, wherein said negative second lens group comprises a negative lens element, cemented lens elements having a negative lens element and a positive lens element, and cemented lens elements having a negative lens element and a positive lens element, in this order from the object.

5. The high zoom-ratio zoom lens system according to claim 1, wherein said negative fifth lens group functions as a focusing lens group; and wherein said high zoom-ratio zoom lens system preferably satisfies the following conditions:

$$2.2<m5t<3.5$$

$$2.0<f5/f2<5.0$$

wherein m5t designates the lateral magnification of said negative fifth lens group at the long focal length extremity;

f5 designates the focal length of said negative fifth lens group; and f2 designates the focal length of said negative second lens group.

6. The high zoom-ratio zoom lens system according to claim 5, satisfying the following condition:

$$1.5<|f5|/fw<4.5 (f5<0)$$

wherein f5 designates the focal length of said negative fifth lens group; and fw designates the focal length of the entire zoom lens system at the short focal length extremity.

7. The high zoom-ratio zoom lens system according to claim 5, wherein said negative fifth lens group comprises a negative lens element, a negative lens element and a positive lens element, in this order from the object.

8. A high zoom-ratio zoom lens system of five lens groups comprises a positive first lens group, a negative second lens group, a positive third lens group, a positive fourth lens group, and a negative fifth lens group, in this order from an object, wherein upon zooming from the short focal length extremity to the long focal length extremity, a distance between said positive first lens group and said negative second lens group increases, and a distance between said negative second lens group and said positive third lens group decreases; and wherein said high zoom-ratio zoom lens system satisfies the following conditions:

$$4.5<f1/fw<10.0$$

$$1.4<fBw/fw<2.0$$

wherein f1 designates the focal length of said positive first lens group;

fw designates the focal length of the entire zoom lens system at the short focal length extremity, and fBw designates the back focal distance at the short focal length extremity.

9. The high zoom-ratio zoom lens system according to claim 8, satisfying the following conditions:

$$0.4<Z2/Z<0.6$$

wherein

Z designates the zoom ratio of the entire zoom lens system (=ft/fw);

Z2 designates the zoom ratio of said negative second lens group (=m2t/m2w);

ft designates the focal length of the entire zoom lens system at the long focal length extremity;

m2w designates the lateral magnification of said negative second lens group at the short focal length extremity; and m2t designates the lateral magnification of said negative second lens group at the long focal length extremity.

10. The high zoom-ratio zoom lens system according to claim 8, wherein said negative second lens group comprises a negative lens element, cemented lens elements having a negative lens element and a positive lens element, and cemented lens elements having a negative lens element and a positive lens element, in this order from the object.

11. The high zoom-ratio zoom lens system according to claim 8, wherein said negative fifth lens group functions as a focusing lens group; and wherein said high zoom-ratio zoom lens system preferably satisfies the following conditions:

$$2.2<m5t<3.5$$

$$2.0<f5/f2<5.0$$

wherein m5t designates the lateral magnification of said negative fifth lens group at the long focal length extremity;

f5 designates the focal length of said negative fifth lens group; and f2 designates the focal length of said negative second lens group.

12. The high zoom-ratio zoom lens system according to claim 11, satisfying the following condition:

$$1.5<|f5|/fw<4.5 (f5<0)$$

wherein f5 designates the focal length of said negative fifth lens group; and fw designates the focal length of the entire zoom lens system at the short focal length extremity.

13. The high zoom-ratio zoom lens system according to claim 11, wherein said negative fifth lens group comprises a negative lens element, a negative lens element and a positive lens element, in this order from the object.

14. A high zoom-ratio zoom lens system comprises a positive first lens group, a negative second lens group, a positive third lens group, and a positive fourth lens group, in this order from the object, wherein upon zooming from the short focal length extremity to the long focal length extremity, a distance between said positive first lens group and said negative second lens group increases, and a distance between said negative second lens group and said positive third lens group decreases; and wherein said high zoom-ratio zoom lens system satisfies the following conditions:

$$5.5 < f1/|f2| < 10.0 (f2<0)$$

$$1.7 < f3/f4 < 4.0$$

$$4.5 < f1/fw < 10.0$$

$$1.4 < fBw/fw < 2.0$$

wherein f1 designates the focal length of said positive first lens group;

f2 designates the focal length of said negative second lens group;

f3 designates the focal length of said positive third lens group;

f4 designates the focal length of the positive fourth lens group; and fw designates the focal length of the entire zoom lens system at the short focal length extremity, and fBw designates the back focal distance at the short focal length extremity.

15. The high zoom-ratio zoom lens system according to claim 14, satisfying the following conditions:

$$0.4 < Z2/Z < 0.6$$

wherein

Z designates the zoom ratio of the entire zoom lens system (=ft/fw);

Z2 designates the zoom ratio of said negative second lens group (=m2t/m2w);

ft designates the focal length of the entire zoom lens system at the long focal length extremity;

m2w designates the lateral magnification of said negative second lens group at the short focal length extremity; and m2t designates the lateral magnification of said negative second lens group at the long focal length extremity.

16. The high zoom-ratio zoom lens system according to claim 14, wherein said negative second lens group comprises a negative lens element, cemented lens elements having a negative lens element and a positive lens element, and cemented lens elements having a negative lens element and a positive lens element, in this order from the object.

17. A high zoom-ratio zoom lens system of five lens groups comprises a positive first lens group, a negative second lens group, a positive third lens group, a positive fourth lens group, and a negative fifth lens group, in this order from an object, wherein focusing is performed by moving said negative fifth lens group in the optical axis direction; and wherein said high zoom-ratio zoom lens system satisfies the following conditions:

$$2.2 < m5t < 3.5$$

$$2.0 < f5/f2 < 5.0$$

wherein m5t designates the lateral magnification of said negative fifth lens group at the long focal length extremity;

f5 designates the focal length of said negative fifth lens group; and f2 designates the focal length of said negative second lens group.

18. The high zoom-ratio zoom lens system according to claim 17, satisfying the following condition:

$$1.5 < |f5|/fw < 4.5 (f5<0)$$

wherein f5 designates the focal length of said negative fifth lens group; and fw designates the focal length of the entire zoom lens system at the short focal length extremity.

19. The high zoom-ratio zoom lens system according to claim 17, wherein said negative fifth lens group comprises a negative lens element, a negative lens element and a positive lens element, in this order from the object.

20. The high zoom-ratio zoom lens system according to claim 17, wherein said negative second lens group comprises a negative lens element, cemented lens elements having a negative lens element and a positive lens element, and cemented lens elements having a negative lens element and a positive lens element, in this order from the object.

* * * * *